(12) United States Patent
Wang et al.

(10) Patent No.: US 11,557,826 B2
(45) Date of Patent: Jan. 17, 2023

(54) ANTENNA UNIT, PREPARATION METHOD, AND ELECTRONIC DEVICE

(71) Applicant: BOE Technology Group Co., Ltd., Beijing (CN)

(72) Inventors: Yali Wang, Beijing (CN); Xiyuan Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/458,606

(22) Filed: Aug. 27, 2021

(65) Prior Publication Data

US 2022/0094038 A1   Mar. 24, 2022

(30) Foreign Application Priority Data

Sep. 24, 2020 (CN) .......................... 202011013807.0

(51) Int. Cl.
*H01Q 1/24* (2006.01)
*H01Q 1/38* (2006.01)
*H01Q 1/48* (2006.01)
*H01Q 9/04* (2006.01)

(52) U.S. Cl.
CPC .............. *H01Q 1/243* (2013.01); *H01Q 1/38* (2013.01); *H01Q 1/48* (2013.01); *H01Q 9/045* (2013.01)

(58) Field of Classification Search
CPC .. H01Q 1/24; H01Q 1/38; H01Q 1/48; H01Q 9/04
See application file for complete search history.

(56) References Cited

U.S. PATENT DOCUMENTS

| | | | | |
|---|---|---|---|---|
| 9,030,373 | B2 * | 5/2015 | Sim | H01Q 17/00 343/702 |
| 2016/0204501 | A1 * | 7/2016 | Bringuier | H04B 5/0087 343/702 |

FOREIGN PATENT DOCUMENTS

| | | |
|---|---|---|
| CN | 102832452 A | 12/2012 |
| CN | 105244614 A | 1/2016 |
| CN | 106410417 A | 2/2017 |
| CN | 111293413 A | 6/2020 |

OTHER PUBLICATIONS

Office Action dated Sep. 2, 2022 for Chinese Patent Application No. 202011013807.0 and English Translation.

* cited by examiner

*Primary Examiner* — Andrea Lindgren Baltzell
(74) *Attorney, Agent, or Firm* — Ling Wu; Stephen Yang; Ling and Yang Intellectual Property

(57) ABSTRACT

An antenna unit includes a dielectric substrate, an antenna layer, a ground layer, and an additional structure; the antenna layer is disposed on a first surface of the dielectric substrate; the ground layer is disposed on a second surface of the dielectric substrate; wherein the first surface and the second surface are opposite surfaces of the dielectric substrate; the additional structure includes any combination of the following structures: a floor meander structure disposed on the second surface and in a same layer as the ground layer to improve isolation of an antenna, a patch meander structure disposed on the first surface and in a same layer as the antenna layer to expand a bandwidth of an antenna, and a branch structure disposed on the second surface and in a same layer as the ground layer to improve isolation of an antenna and expand a bandwidth of the antenna.

19 Claims, 8 Drawing Sheets

US 11,557,826 B2

ANTENNA UNIT, PREPARATION METHOD, AND ELECTRONIC DEVICE

CROSS-REFERENCE TO RELATED APPLICATION

The present application claims the priority to Chinese Patent Application No. 202011013807.0 filed to the CNIPA on Sep. 24, 2020, the content of which is incorporated herein by reference.

TECHNICAL FIELD

Embodiments of the present disclosure relate to, but are not limited to, the field of communication technologies, in particular to an antenna unit, a preparation method, and an electronic device.

BACKGROUND

Antenna units are widely used in the field of communication such as communication, navigation, and radar. At present, with development of electronic devices, an antenna unit tends to be miniaturized, which making spacing of each structure in the antenna unit more and more compact, and causing a mutual coupling effect. However, an intensive mutual coupling effect will change amplitude and phase distribution of a current of the antenna unit, resulting in poor antenna performance.

SUMMARY

Following is a summary of the subject matter described herein in detail. The summary is not intended to limit the scope of protection of claims.

Embodiments of the present disclosure mainly provide the following technical solutions.

In a first aspect, an embodiment of the present disclosure provides an antenna unit, which includes a dielectric substrate, an antenna layer, a ground layer, and an additional structure configured to improve antenna performance; the antenna layer is disposed on a first surface of the dielectric substrate; the ground layer is disposed on a second surface of the dielectric substrate; wherein the first surface and the second surface are opposite surfaces of the dielectric substrate; the additional structure includes any combination of the following structures: a floor meander structure disposed on the second surface and in a same layer as the ground layer to improve isolation of an antenna, a patch meander structure disposed on the first surface and in a same layer as the antenna layer to expand ae bandwidth of an antenna, and a branch structure disposed on the second surface and in a same layer as the ground layer to improve isolation of an antenna and expand a bandwidth of the antenna.

In a second aspect, an embodiment of the present disclosure provides an electronic device including the antenna unit described in any of the above embodiments.

In a third aspect, an embodiment of the present disclosure provides a preparation method of an antenna unit, which includes: forming a de-bonding layer on a glass substrate; forming a ground layer, a floor meander structure, and a branch structure on a surface of the de-bonding layer away from the glass substrate; forming a flexible dielectric substrate on a surface of the floor meander structure and the branch structure away from the glass substrate; forming a radiation patch and a micro-strip feeder on a surface of the flexible dielectric substrate away from the glass substrate, wherein a patch meander structure is formed on the radiation patch; and peeling off the de-bonding layer and the glass substrate.

Other features and advantages of the present disclosure will be described in the following description, and will be partially apparent from the specification, or understood by implementing the present disclosure. Other advantages of the present disclosure may be achieved and obtained by solutions described in the specification and drawings.

After the drawings and the detailed descriptions are read and understood, other aspects may be comprehended.

BRIEF DESCRIPTION OF DRAWINGS

The drawings provide an understanding to the technical solutions of the present disclosure, form a part of the specification, and are adopted to explain, together with the embodiments of the present disclosure, the technical solutions of the present disclosure and not intended to form limits to the technical solutions of the present disclosure. The shape and size of each component in the drawings do not reflect true proportions and only to be used to schematically illustrate contents of the present invention.

DETAILED DESCRIPTION

Figure 1:
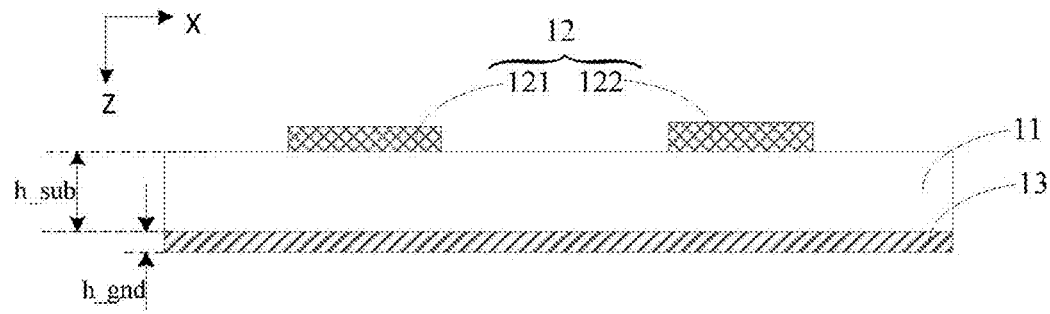
FIG. 1 is a schematic diagram of a first structure of an antenna unit according to an embodiment of the present disclosure.

The following will clearly and completely describe the technical solutions of the embodiments of the present disclosure with reference to the drawings of the embodiments of the present disclosure. The following embodiments serve to illustrate the present disclosure, but are not intended to limit the scope of the present disclosure. Without conflict, the embodiments in the present disclosure and the features in the embodiments may be randomly combined with each other.

An embodiment of the present disclosure provides an antenna unit, which includes: a dielectric substrate, an antenna layer, a ground layer, and an additional structure configured to improve antenna performance; the antenna layer is disposed on a first surface of the dielectric substrate; and the ground layer is disposed on a second surface of the dielectric substrate; the additional structure may include: any combination of the following structures of a floor meander structure disposed on the second surface and in the same layer as the ground layer to improve isolation of an antenna, a patch meander structure disposed on the first surface and in the same layer as the antenna layer to expand a bandwidth of an antenna, and a branch structure disposed on the second surface and in the same layer as the ground layer to improve isolation and expand a bandwidth of an antenna; wherein the first surface and the second surface are opposite surfaces of the dielectric substrate.

In an exemplary embodiment, the branch structure may include a first branch structure and a second branch structure; wherein, the first branch structure may include a first branch and a second branch, wherein a first end of the first branch is connected to the ground layer, a second end of the first branch extends along a first direction, a first end of the second branch is connected to the second end of the first branch, and a second end of the second branch extends away from the first branch along a second direction, wherein the first direction is a direction away from the ground layer, and the second direction crosses the first direction; the second branch structure may include a third branch and a fourth branch, wherein a first end of the third branch is connected to the ground layer, a second end of the third branch extends along a first direction, a first end of the fourth branch is connected to the second end of the third branch, and a second end of the fourth branch extends away from the third branch along a second direction.

In an exemplary embodiment, a ratio of a second length of a second branch to a second length of a first branch may range from 2.67 to 4, wherein the second length of the second branch and the second length of the first branch are distance characteristics in a second direction.

In an exemplary embodiment, shapes of a first branch, a second branch, a third branch, and a fourth branch may be rectangular or trapezoidal.

In an exemplary embodiment, a dielectric substrate has a center line extending along a first direction, and a first branch structure and a second branch structure are symmetrical with respect to the center line of the dielectric substrate.

In an exemplary embodiment, an antenna layer may include a radiation patch and a micro-strip feeder; a radiation patch may include a first radiation patch and a second radiation patch; a micro-strip feeder may include a first micro-strip feeder and a second micro-strip feeder; wherein the first micro-strip feeder is connected to the first radiation patch and is configured to feed the first radiation patch, and the second micro-strip feeder is connected to the second radiation patch and is configured to feed the second radiation patch; a patch meander structure may include at least one of a first radiation groove disposed on the first radiation patch and a second radiation groove disposed on the second radiation patch.

In an exemplary embodiment, a first radiation patch may include a first edge, a second edge, a third edge, and a fourth edge which are connected in sequence, wherein the first edge is an edge in the first direction and away from the second radiation patch, the second edge is an edge in the second direction and away from the ground layer, the third edge is an edge in the first direction and close to the second radiation patch, and the fourth edge is an edge in the second direction and close to the ground layer; wherein the first edge and the third edge are opposite sides, the second edge and the fourth edge are opposite sides, the first direction is away from the ground layer, and the second direction crosses the first direction.

The second radiation patch may include a fifth edge, a sixth edge, a seventh edge, and an eighth edge which are connected in sequence, wherein the fifth edge is an edge in the first direction and close to the first radiation patch, the sixth edge is an edge in the second direction and away from the ground layer, the seventh edge is an edge in the first direction and away from the first radiation patch, and the eighth edge is an edge in the second direction and close to the ground layer, wherein the fifth edge and the seventh edge are opposite sides, the sixth edge and the eighth edge are opposite sides, and the fifth edge is opposite to the third edge.

A first radiation groove may include at least one of a groove disposed on the first edge, a groove disposed on the second edge, a groove disposed on the third edge, and a groove disposed on the fourth edge.

A second radiation groove may include at least one of a groove disposed on the fifth edge, a groove disposed on the sixth edge, a groove disposed on the seventh edge, and a groove disposed on the eighth edge.

In an exemplary embodiment, an disposing mode of a patch meander structure may include one or more of the following modes: a distance between a lower edge of the groove provided on the first edge and the fourth edge is greater than a distance between a lower edge of the groove provided on the third edge and the fourth edge, a distance between a second groove provided on the fifth edge and the eighth edge is greater than a distance between the groove provided on the seventh edge and the eighth edge, a distance between a lower edge of the groove provided on the first edge and the fourth edge equals to a distance between a second groove provided on the fifth edge and the eighth edge, and a distance between a lower edge of the groove provided on the third edge and the fourth edge equals to a distance between the groove provided on the seventh edge and the eighth edge.

In an exemplary embodiment, a ratio of a first length of a first radiation groove to a second length of the first radiation groove may be 2.4 to 3.6, and/or a ratio of a first length of a second radiation groove to a second length of the second radiation groove may range from 2.4 to 3.6; wherein the first length of the first radiation groove and the first length of the second radiation groove are distance characteristics in a first direction, the second length of the first radiation groove and the second length of the second radiation groove are distance characteristics in a second direction, wherein the first direction is a direction away from the ground layer, and the second direction crosses the first direction.

In an exemplary embodiment, an antenna layer may include a radiation patch and a micro-strip feeder; a radiation patch may include a first radiation patch and a second radiation patch; a micro-strip feeder may include a first micro-strip feeder and a second micro-strip feeder; wherein the first micro-strip feeder is connected to the first radiation patch and is configured to feed the first radiation patch, and the second micro-strip feeder is connected to the second radiation patch and is configured to feed the second radiation patch.

A floor meander structure may include at least one of a first floor groove corresponding to a first micro-strip feeder, a second floor groove disposed between the first micro-strip feeder and a second micro-strip feeder, and a third floor groove corresponding to the second micro-strip feeder.

In an exemplary embodiment, a size of a floor meander structure may include one or more of the following: a ratio of a first length of the second floor groove to a first length of the first floor groove may be 1.12 to 1.68, a ratio of a first length of the second floor groove to a first length of the ground layer may be 0.7 to 0.95, a ratio of a second length of the second floor groove to a second length of the first floor groove may be 0.21 to 0.32, a ratio of a distance between a lower edge of the first radiation patch close to the ground layer and a bottom of the first floor groove, to a first length of the first floor groove may be 1.1 to 1.44, a ratio of a second length of the first floor groove to a second length of the first micro-strip feeder may be 1.8 to 2.7, a ratio of a first length of the second floor groove to a first length of the third floor groove may be 1.12 to 1.68, a ratio of a second length of the second floor groove to a second length of the third floor groove may be 0.21 to 0.32, a ratio of a distance between a lower edge of the second radiation patch close to the ground layer and a bottom of the third floor groove, to a first length of the third floor groove may be 1.1 to 1.44, and a ratio of a second length of the third floor groove to a second length of the second micro-strip feeder may be 1.8 to 2.7.

The first length of a first floor groove, the first length of a second floor groove, the first length of a third floor groove, and the first length of the ground layer are distance characteristics in a first direction, and the second length of a first radiation groove, the second length of a second radiation groove, the second length of a third floor groove, the second length of a first micro-strip feeder, and the second length of a second micro-strip feeder are distance characteristics in a second direction, wherein the first direction is a direction away from the ground layer, and the second direction crosses the first direction.

In an exemplary embodiment, shapes of a first floor groove, a second floor groove, and a third floor groove may be rectangular or trapezoidal.

In an exemplary embodiment, a ratio of a distance between a central position of a first radiation patch and a central position of a second radiation patch, to a second length of a dielectric substrate may be 0.4 to 0.6, and a second length of the dielectric substrate is a distance characteristic in a second direction, wherein a first direction is a direction away from the ground layer, and the second direction crosses the first direction.

In one aspect, for an antenna unit provided by an embodiment of the present disclosure, a meandering technology is used to provide a floor meander structure on a ground layer, which may reduce a surface wave current of a ground layer, reduce an influence of a mutual coupling effect (or a coupling effect) of an antenna, and further improve isolation of the antenna. In another aspect, the meandering technology may be used to create a patch meander structure on a radiation patch in an antenna layer, which may bend a path of a current on a surface of the radiation patch, thus extending an effective length of the path of the current, reducing a resonant frequency, and further increasing an electrical length and expanding a bandwidth of the antenna. In yet another aspect, a branch structure may be provided on the ground layer, and a shape and a structure of an edge of the ground layer may be changed, so that a current flows in a zigzag manner, which can not only increase an electrical length of the current, but also add new resonance points, thereby improving isolation of an antenna and expanding a bandwidth of the antenna. In this way, by providing an additional structure in an antenna unit, a performance of an antenna can be enhanced.

The antenna unit described above will be described in detail with reference to the accompanying drawings.

In an exemplary embodiment, taking an antenna layer including a radiation patch and a micro-strip feeder as an example, as shown in FIG. 1, the antenna unit may include a dielectric substrate 11, a radiation patch 12 and a micro-strip feeder (not shown in FIG. 1) that are located on a first surface of the dielectric substrate 11, a ground layer 13 located on a second surface of the dielectric substrate, and an additional structure (not shown in FIG. 1) configured to enhance a performance of an antenna. The first surface and the second surface are opposite surfaces of the dielectric substrate; and the radiation patch 12 may include a first radiation patch 121 and a second radiation patch 122.

Figure 2:
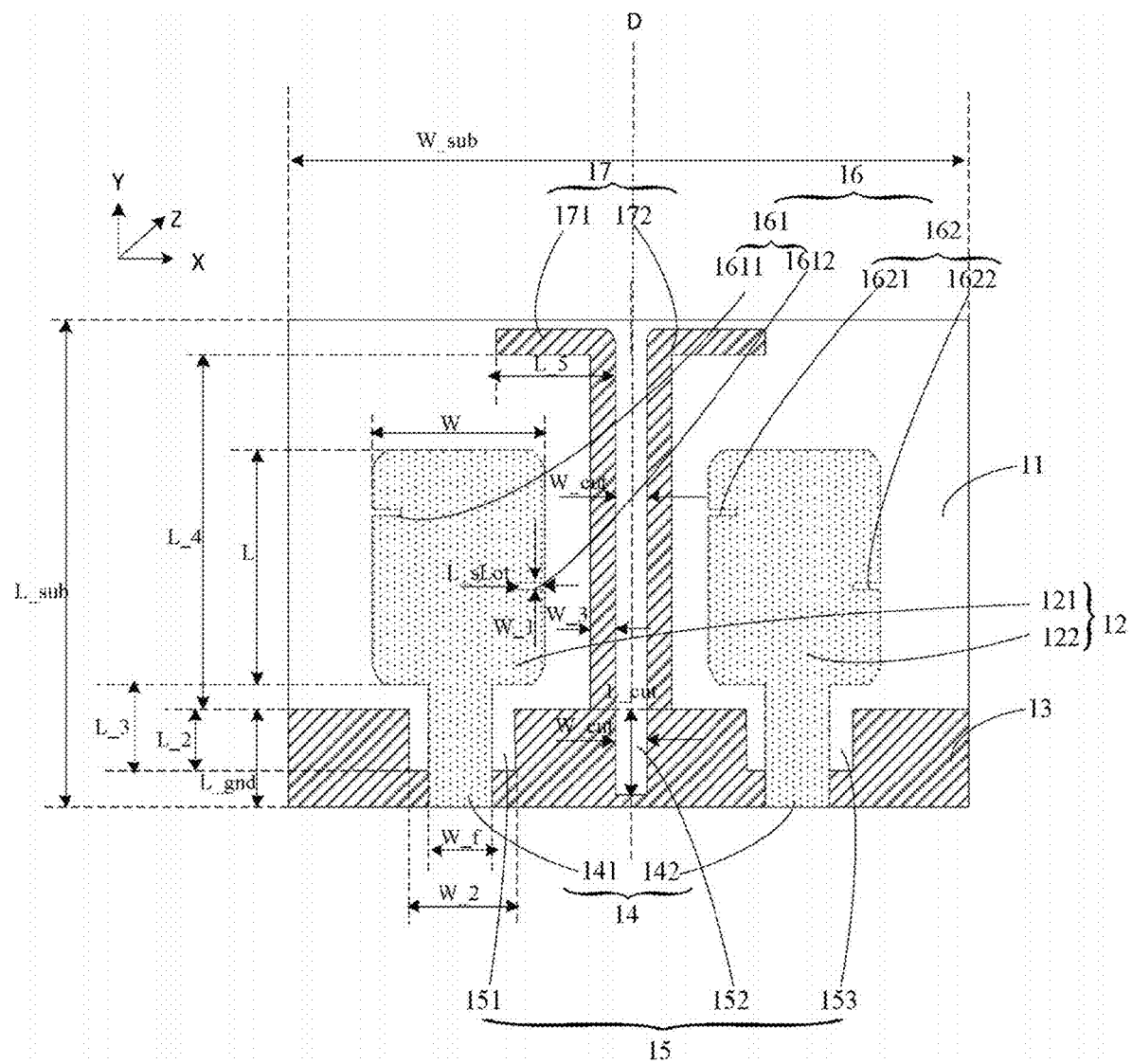
FIG. 2 is a schematic diagram of a second structure of an antenna unit according to an embodiment of the present disclosure.

As shown in FIG. 2, the micro-strip feeder 14 may include a first micro-strip feeder 141 and a second micro-strip feeder 142; wherein the first micro-strip feeder 141 is connected to the first radiation patch 121 and is configured to feed the first radiation patch 121, and the second micro-strip feeder 142 is connected to the second radiation patch 122 and is configured to feed the second radiation patch 122; the additional structure may include: a floor meander structure 15 disposed on the ground layer, a patch meander structure 16 disposed on the radiation patch, and a branch structure 17 disposed on the ground layer.

In an exemplary embodiment, the dielectric substrate may be a rigid dielectric substrate or a flexible dielectric substrate.

In an exemplary embodiment, taking a dielectric substrate as a rigid dielectric substrate as an example, the dielectric substrate may include, but is not limited to, one of rigid dielectric substrates such as epoxy glass cloth (FR-4) laminate, polytetrafluoroethylene glass fiber laminate, phenolic glass cloth laminate, and glass substrate. In this way, a prepared antenna unit has advantages of wider material sources, better stability, better insulation effect, low microwave loss, hardly affecting adversely transmission of radio signals or electromagnetic waves, better hardness, and better antenna performance and the like. Here, FR-4 is a code name for a grade of a fire-resistant material.

In an exemplary embodiment, taking a dielectric substrate as a flexible dielectric substrate as an example, the dielectric substrate may include, but is not limited to, one of flexible dielectric substrates made of polymer materials such as polyimide (PI), polyethylene terephthalate (PET), polyethylene naphthalate (PEN), and polycarbonate (PC). In this way, a prepared antenna unit has advantages of wider material sources, good flexibility, light weight, and better impact resistance. When the antenna unit is applied to an electronic device or a multi-input multi-output antenna including the antenna unit is applied to an electronic device, a limitation of a shape or size of the electronic device on the antenna unit may be reduced, and the antenna unit has an advantage that it may be better integrated with other components in the electronic device.

In an exemplary embodiment, a first radiation patch and a second radiation patch may be symmetrically disposed. For example, as shown in FIG. 2, the first radiation patch 121 and the second radiation patch 122 may be symmetrically disposed on both sides of a center line D of a dielectric substrate.

In an exemplary embodiment, an arrangement of a first radiation patch on a ground layer may be the same as an arrangement of a second radiation patch on the ground layer. For example, the first radiation patch and the second radiation patch may have the same shape, size, and material.

In an exemplary embodiment, a first radiation patch and a second radiation patch may include but are not limited to being made of at least one of metal materials such as copper, gold, and silver. In this way, a ground layer has a lower resistance, higher transmission signal sensitivity, less metal loss, and a longer life span.

In an exemplary embodiment, shapes of a first radiation patch and a second radiation patch may include, but are not limited to, one of rectangular, circular, triangular, fan-shaped and the like. For example, as shown in FIG. 2, the shapes of the first radiation patch 121 and the second radiation patch 122 may be rectangular.

In an exemplary embodiment, at least one of at least one corner of the first radiation patch and at least one corner of the second radiation patch is an arc chamfer. For example, as shown in FIG. 2, four corners of the first radiation patch 121 and the second radiation patch 122 may all adopt arc chamfers.

In an exemplary embodiment, a first direction Y is away from the ground layer, a second direction X is perpendicular to the first direction Y, and a ratio of a distance between a central position of the first radiation patch and a central position of the second radiation patch (distance characteristic in the second direction X) to a width W_sub of a dielectric substrate (distance characteristic in the second direction X) may be 0.4 to 0.6. For example, the width W_sub of the dielectric substrate may be 32 mm, and the distance between the central position of the first radiation patch and the central position of the second radiation patch may be 16 mm.

In an exemplary embodiment, a first micro-strip feeder and a second micro-strip feeder may be symmetrically disposed. For example, as shown in FIG. 2, the first micro-strip feeder 141 and the second micro-strip feeder 142 may be symmetrically disposed on both sides of a center line D of a dielectric substrate.

In an exemplary embodiment, a first micro-strip feeder and a second micro-strip feeder may include, but are not limited to, being made of at least one of metal materials such as copper, gold, and silver. In this way, a micro-strip feeder has a lower resistance, higher transmission signal sensitivity, less metal loss, and a longer life span.

In an exemplary embodiment, a first micro-strip feeder and a first radiation patch may have an integrated structure, and a second micro-strip feeder and a second radiation patch may have an integrated structure.

In an exemplary embodiment, a ground layer may include, but is not limited to, being made of at least one of metal materials such as copper, gold, and silver. In this way, a ground layer has a lower resistance, higher transmission signal sensitivity, less metal loss, and a longer life span.

In an exemplary embodiment, a ground layer and a floor meander structure may have an integrated structure.

In an exemplary embodiment, a ground layer and a branch structure may have an integrated structure.

In an exemplary embodiment, a floor meander structure may include, but is not limited to, one floor groove or multiple floor grooves disposed at intervals. In this way, by providing a floor groove on a ground layer, a surface wave current on a ground layer may be reduced and an influence of a mutual coupling effect (or a coupling effect) of an antenna may be reduced, and isolation of the antenna may be improved. In this way, a performance of the antenna can be enhanced.

In an exemplary embodiment, taking a floor meander structure including multiple floor grooves as an example, an arrangement of the multiple floor grooves may include any one or more of: a center line of one of the multiple floor grooves coincides with a center line of a dielectric substrate, and two of the multiple floor grooves may be symmetrically disposed on both sides of a center line of a dielectric substrate.

For example, as shown in FIG. 2, the floor meander structure 15 may include a first floor groove 151, a second floor groove 152, and a third floor groove 153, a center line of the second floor groove 152 coincides with a center line D of a dielectric substrate, and the first floor groove 151 and the third floor groove 153 are symmetrically disposed on both sides of the center line D of the dielectric substrate, that is, a first floor groove and a third floor groove are symmetrically arranged on both sides of a second floor groove. In this way, isolation between two ports formed by a ground layer and a micro-strip feeder on an antenna unit can be improved.

In an exemplary embodiment, shapes of a first floor groove, a second floor groove, and a third floor groove may include, but are not limited to, one of rectangular, trapezoidal, and H-shaped. For example, as shown in FIG. 2, shapes of the first floor groove 151, the second floor groove 152, and the third floor groove 153 may all be rectangular.

In an exemplary embodiment, a size of a first floor groove and a size of a third floor groove may be the same.

In an exemplary embodiment, a first length (distance characteristic in a first direction Y) of a second floor groove may be larger than a first length (distance characteristic in the first direction Y) of a first floor groove, and may be smaller than a first length (distance characteristic in the first direction Y) of a ground layer. For example, as shown in FIG. 2, a ratio of a first length L_cut of the second floor groove to a first length L_2 of the first floor groove may be 1.12 to 1.68, and a ratio of the first length L_cut of the second floor groove to a first length L_gnd of the ground layer may be 0.7 to 0.95.

In an exemplary embodiment, a second length (distance characteristic in a second direction X) of a second floor groove may be smaller than a second length (distance characteristic in the second direction X) of a first floor groove, and a second length of the first floor groove may be the same as a second length of a third floor groove. For example, as shown in FIG. 2, a ratio of a second length W_cut of the second floor groove to a second length W_2 of the first floor groove may be 0.21 to 0.32.

In an exemplary embodiment, an orthographic projection of a first floor groove on a dielectric substrate at least partially overlaps with an orthographic projection of a first micro-strip feeder on the dielectric substrate; and an orthographic projection of a third floor groove on the dielectric substrate at least partially overlaps with an orthographic projection of a second micro-strip feeder on the dielectric substrate.

In an exemplary embodiment, a patch meander structure may include, but is not limited to, one or more radiation grooves. In this way, providing a radiation groove on a radiation patch may cause a path of a current on a surface of the radiation patch to bend, thus extending an effective length of the path of the current, reducing a resonant frequency, and further increasing an electrical length of an antenna and expanding a bandwidth of the antenna.

In an exemplary embodiment, as shown in FIG. 2, a patch meander structure 16 may include a first radiation groove 161 on the first radiation patch 121 and a second radiation groove 162 on the second radiation patch 122.

In an exemplary embodiment, an arrangement of a first radiation groove on a first radiation patch may be the same as an arrangement of a second radiation groove on a second radiation patch. For example, a quantity, a shape, a size, and a disposing position of the first radiation groove and that of the second radiation groove may be all the same.

In an exemplary embodiment, a first radiation groove may be disposed at an edge of a first radiation patch, and a second radiation groove may be disposed at an edge of a second radiation patch. Or, a first radiation groove may be disposed at a central position of a first radiation patch (i.e., a central position of the first radiation groove may coincide with the central position of the first radiation patch), and a second radiation groove may be disposed at a central position of a second radiation patch (i.e., a central position of the second radiation groove may coincide with the central position of the second radiation patch). Of course, the first radiation groove and the second radiation groove may have other disposing positions, which is not limited in the embodiment of the present disclosure.

For example, taking a first radiation patch and a second radiation patch being rectangles as an example, the first radiation patch may include: a first edge (edge located in Y direction and away from the second radiation patch), a second edge (edge located in X direction and away from the ground layer), a third edge (edge located in Y direction and close to the second radiation patch), and a fourth edge (edge located in X direction and close to the ground layer). The second radiation patch may include a fifth edge (located in Y direction and close to the first radiation patch), a sixth edge (located in X direction and away from the ground layer), a seventh edge (located in Y direction and away from the first radiation patch), and an eighth edge (located in X direction and close to the ground layer). The first edge is opposite to the third edge, the second edge is opposite to the fourth edge, the fifth edge is opposite to the seventh edge, the sixth edge is opposite to the eighth edge, and the third edge is opposite to the fifth edge. Then, the first radiation groove may be disposed at any position among the first edge, the second edge, the third edge, and the fourth edge; the second radiation groove may be disposed at any position among the fifth edge, the sixth edge, the seventh edge, and the eighth edge.

In an exemplary embodiment, a quantity of the first radiation groove or the second radiation groove may be one or more, such as two and three.

In an exemplary embodiment, disposing positions of one or more first radiation grooves and disposing positions of one or more second radiation grooves may be in one-to-one correspondence. For example, as shown in FIG. 2, the first radiation groove 161 may include a first groove 1611 on the first edge and a second groove 1612 on the third edge, and the second radiation groove 162 may include a third groove 1621 on the fifth edge and a fourth groove 1622 on the seventh edge. A distance between a lower edge of the first groove 1611 and the fourth edge may be equal to a distance between a lower edge of the third groove 1621 and the eighth edge, a distance between a lower edge of the second groove 1612 and the fourth edge equals to a distance between a lower edge of the fourth groove 1622 and the fourth edge, and a distance between the fourth edge and a lower edge of a ground layer equals to a distance between the eighth edge and a lower edge of the ground layer.

In an exemplary embodiment, a branch structure may include, but is not limited to, one of an inverted L-shaped branch structure, an F-shaped branch structure, and a C-shaped branch structure.

In an exemplary embodiment, a quantity of branch structures may be multiple, such as two.

In an exemplary embodiment, taking a quantity of branch structures as two as an example, as shown in FIG. 2, a branch structure 17 may include a first branch structure 171 close to the first radiation patch and a second branch structure 172 close to the second radiation patch. In this way, a size of an antenna may be kept small, while a path of a current on the antenna may be increased, thereby increasing an electrical length of the antenna, improving isolation between two ports formed by a ground layer and a microstrip feeder on an antenna unit, and further increasing new resonance points, thereby expanding a bandwidth of the antenna. Furthermore, a performance of the antenna may be enhanced.

In an exemplary embodiment, a first branch structure and a second branch structure may be symmetrically disposed. For example, as shown in FIG. 2, the first branch structure 171 and the second branch structure 172 may be symmetrically disposed on both sides of a center line D of a dielectric substrate, and the first branch structure 171 and the second branch structure 172 are disposed between the first radiation patch 121 and the second radiation patch 122.

In an exemplary embodiment, taking a first branch structure and a second branch structure all being inverted L-shaped as an example, the first branch structure may include: a first branch and a second branch, wherein a first end of the first branch is connected to a ground layer, a second end of the first branch extends along a first direction Y, a first end of the second branch is connected to the second end of the first branch, and a second end of the second branch extends away from the first branch along a second direction X; the second branch structure may include a third branch and a fourth branch, wherein a first end of the third branch is connected to a ground layer, a second end of the third branch extends along a first direction Y, a first end of the fourth branch is connected to the second end of the third branch, and a second end of the fourth branch extends away from the third branch along a second direction X.

In an exemplary embodiment, a first length of the first branch (distance characteristic in the first direction Y) may be larger than a first length of the first radiation patch, and the first length of the first branch (distance characteristic in the first direction Y) may be larger than a second length of the second branch (distance characteristic in the second direction X); a first length of the third branch (distance characteristic in the first direction Y) may be larger than a first length of a second radiation patch, and a first length of the third branch (distance characteristic in the first direction Y) may be larger than a second length of the fourth branch (distance characteristic in the second direction X). For example: a ratio of the first length of the first branch (distance characteristic in the first direction Y) to a first length of a first radiation patch (distance characteristic in the first direction Y) may be between 1.19 and 1.78, a ratio of the first length of the first branch (distance characteristic in the first direction Y) to the second length of the second branch (distance characteristic in the second direction X) may be between 5.36 and 8.0, a ratio of the first length of the third branch (distance characteristic in the first direction Y) to the first length of the second radiation patch (distance characteristic in the first direction Y) may be 1.19 to 1.78, and a ratio of the first length of the third branch (distance characteristic in the first direction Y) to the second length of the fourth branch (distance characteristic in the second direction X) may be 5.36 to 8.04.

In an exemplary embodiment, a radius of an arc chamfer may be equal to a second length of a first branch (distance characteristic in the second direction X), or a radius of an arc chamfer may be equal to a first length of a second branch (distance characteristic in the first direction Y).

In an exemplary embodiment, shapes of a first branch, a second branch, and a third branch, and a fourth branch may be rectangular or trapezoidal.

In an exemplary embodiment, at least one of at least one corner of the first branch structure and at least one corner of the second branch structure is an arc chamfer. For example, as shown in FIG. 2, a corner facing the second branch structure 172 at a joint between the first branch and the second branch in the first branch structure 171 and a corner facing the first branch structure 171 at a joint between the third branch and the fourth branch in the second branch structure 172 may all adopt arc chamfers.

In an exemplary embodiment, a distance between a first branch structure and a second branch structure may be equal to a width of a second floor groove.

In an exemplary embodiment, a first branch structure and a second branch structure, and a ground layer may be an integral structure.

In one aspect, for an antenna unit provided by the embodiment of the present disclosure, a meandering technology is used to provide a floor meander structure on a ground layer, which may reduce a surface wave current of the ground layer, reduce an influence of a mutual coupling effect (or a coupling effect) of an antenna, and further improve isolation of the antenna.

In another aspect, a meandering technology is used to create a patch meander structure on a radiation patch in an antenna layer, which may bend a path of a current on a surface of the radiation patch, thus extending an effective length of the path of the current, reducing a resonant frequency, and further increasing an electrical length of an antenna and expanding a bandwidth of the antenna. In yet another aspect, a branch structure is provided on a ground layer, and a shape and a structure of an edge of the ground layer may be changed, so that a current flows in a zigzag manner, which can not only increase an electrical length of the current, but also add new resonance points, thereby improving isolation of an antenna and expanding a bandwidth of the antenna. In this way, a performance of the antenna can be greatly enhanced.

Based on the foregoing embodiments, an embodiment of the present disclosure further provides an antenna unit. The antenna unit may be applied to the following scenario: an antenna layer includes a radiation patch and a micro-strip feeder, and an additional structures includes a floor meander structure disposed on a ground floor and a patch meander structure disposed on the radiation patch, wherein the floor meander structure is achieved by a floor groove and the patch meander structure is achieved by a radiation groove.

Figure 3:
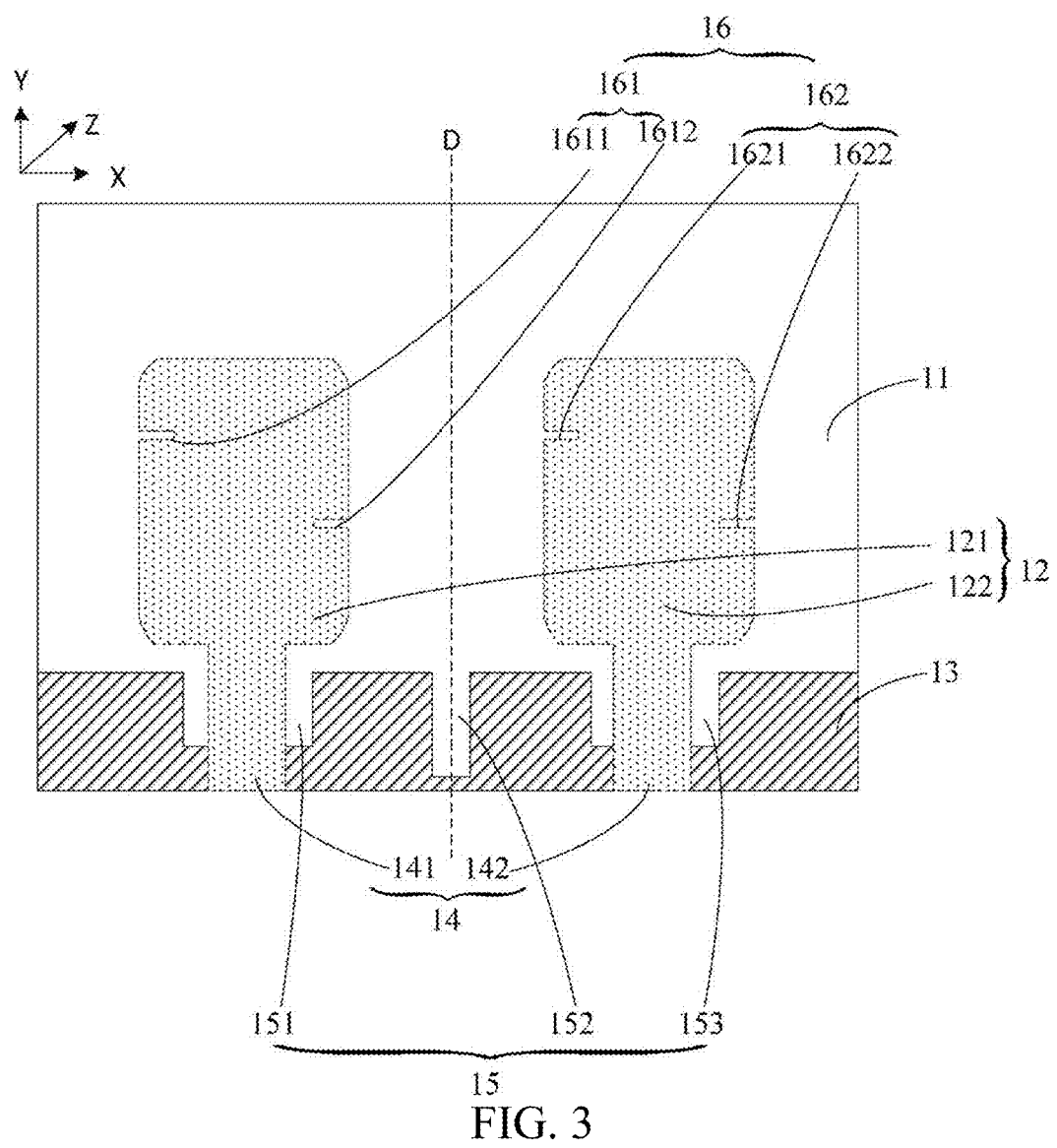
FIG. 3 is a schematic diagram of a third structure of an antenna unit according to an embodiment of the present disclosure.

In an exemplary embodiment, as shown in FIG. 3, the antenna unit may include a dielectric substrate 11, a radiation patch 12, a micro-strip feeder 14, a ground layer 13, and an additional structure.

The dielectric substrate 11 may include a first surface and a second surface; wherein the first surface and the second surface are opposite surfaces of the dielectric substrate 11.

The radiation patch 12 may include a first radiation patch 121 and a second radiation patch 122 that are located on the first surface of the dielectric substrate 11.

The micro-strip feeder 14 may include a first micro-strip feeder 141 and a second micro-strip feeder 142 that are located on the first surface of the dielectric substrate 11, the first micro-strip feeder 141 is connected to the first radiation patch 121, and the second micro-strip feeder 142 is connected to the second radiation patch 122.

The ground layer 13 is located on the second surface of the dielectric substrate 11.

The additional structure may include a floor meander structure 15 disposed on a ground layer and a patch meander structure 16 disposed on a radiation patch.

The floor meander structure 15 may include a first floor groove 151, a second floor groove 152, and a third floor groove 153, which are located on the ground layer 13, an orthographic projection of the first floor groove 151 on the dielectric substrate 11 partially overlaps with an orthographic projection of the first micro-strip feeder 141 on the dielectric substrate 11, and an orthographic projection of the third floor groove 153 on the dielectric substrate 11 partially overlaps an orthographic projection of the second micro-strip feeder 142 on the dielectric substrate 11.

The patch meander structure may include a first radiation groove 161 on an edge of the first radiation patch 121 and a second radiation groove 162 on an edge of the second radiation patch 122, wherein, the first radiation groove 161 include a first groove 1611 located on a left edge of the first radiation patch 121 (located in a Y direction and away from the edge of the second radiation patch) and a second groove 1612 located on a right edge of the first radiation patch 121 (located in the Y direction and close to the edge of the second radiation patch), and the second radiation groove 162 include a third groove 1621 located on a left edge of the second radiation patch 122 (located in the Y direction and close to the edge of the first radiation patch) and a fourth groove 1622 located on a right edge of the second radiation patch 122 (located in the Y direction and away from the edge of the first radiation patch).

In one aspect, for an antenna unit provided by the embodiment of the present disclosure, a meandering technology is used to provide a floor groove on a ground layer, which may reduce a surface wave current of the ground layer, reduce an influence of a mutual coupling effect (or a coupling effect) of the antenna, thereby avoiding deterioration of some characteristic parameters of an antenna caused by the mutual coupling effect and further improving isolation of the antenna. In another aspect, by using a meandering technology and providing a radiation groove on a radiation patch, a path of a current on a surface of the radiation patch may be bent, thus extending an effective length of the path of the current, reducing a resonant frequency, and further increasing an electrical length of an antenna and expanding a bandwidth of the antenna. In this way, a performance of the antenna can be greatly enhanced.

Based on the foregoing embodiments, an embodiment of the present disclosure further provides an antenna unit. The antenna unit may be applied to the following scenario: an antenna layer includes a radiation patch and a micro-strip feeder, and an additional structure includes a floor meander structure disposed on a ground layer and a branch structure disposed on the ground layer, wherein the floor meander structure is achieved by a floor groove, and a quantity of branch structures is two.

Figure 4:
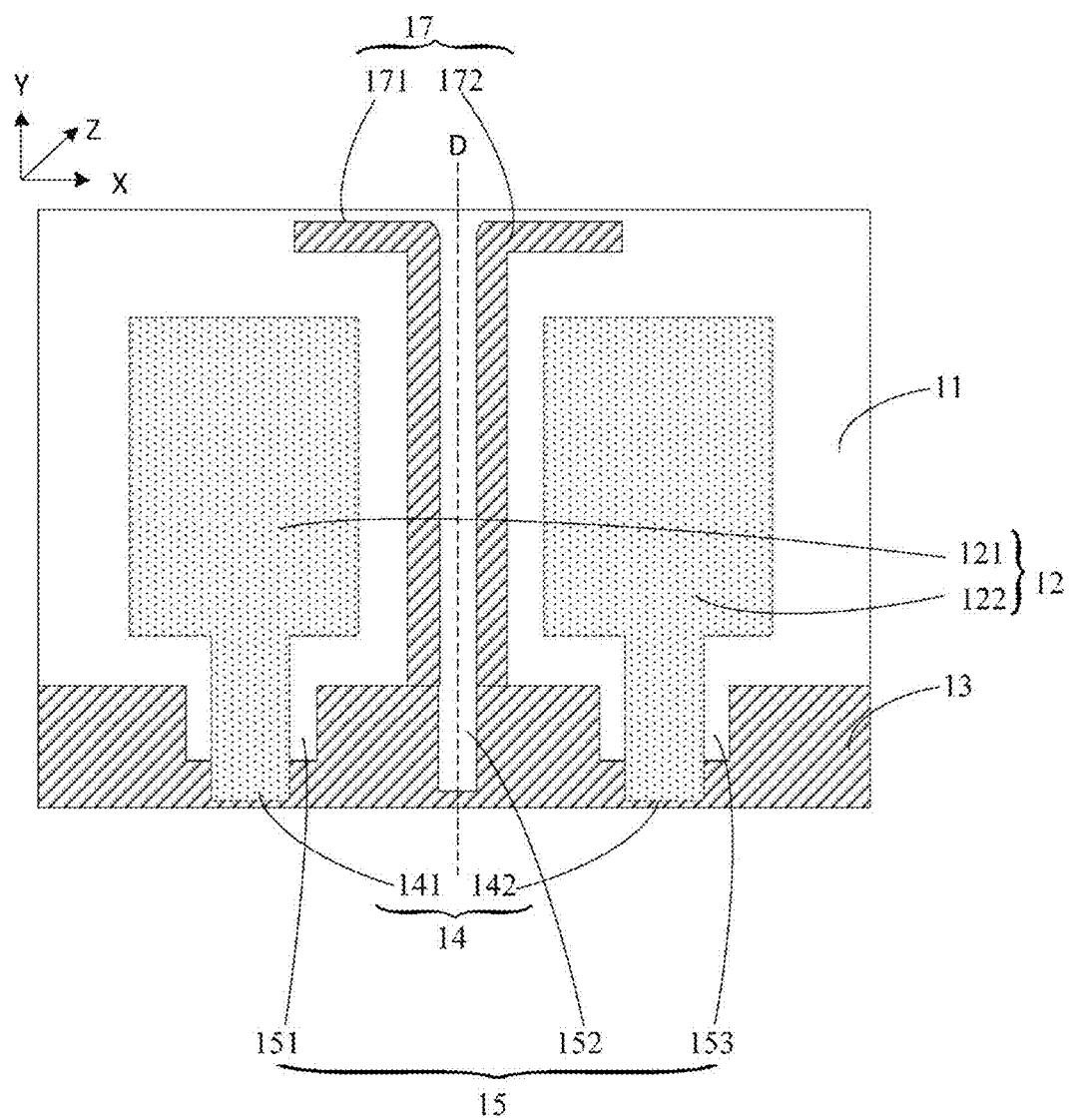
FIG. 4 is a schematic diagram of a fourth structure of an antenna unit according to an embodiment of the present disclosure.

In an exemplary embodiment, as shown in FIG. 4, the antenna unit may include a dielectric substrate 11, a radiation patch 12, a micro-strip feeder 14, a ground layer 13, and an additional structure.

The dielectric substrate 11 may include a first surface and a second surface; wherein the first surface and the second surface are opposite surfaces of the dielectric substrate 11.

The radiation patch 12 may include a first radiation patch 121 and a second radiation patch 122 that are located on the first surface of the dielectric substrate 11.

The micro-strip feeder 14 may include a first micro-strip feeder 141 and a second micro-strip feeder 142 that are located on the first surface of the dielectric substrate 11, the first micro-strip feeder 141 is connected to the first radiation patch 121, and the second micro-strip feeder 142 is connected to the second radiation patch 122.

The ground layer 13 is located on the second surface of the dielectric substrate 11.

The additional structure may include a floor meander structure 15 disposed on a ground layer and a branch structure 17 disposed on the ground layer.

The floor meander structure 15 may include a first floor groove 151, a second floor groove 152, and a third floor groove 153, which are located on the ground layer 13, an orthographic projection of the first floor groove 151 on the dielectric substrate 11 partially overlaps with an orthographic projection of the first micro-strip feeder 141 on the dielectric substrate 11, and an orthographic projection of the third floor groove 153 on the dielectric substrate 11 partially overlaps an orthographic projection of the second micro-strip feeder 142 on the dielectric substrate 11.

The branch structure 17 may include a first branch structure 171 close to the first radiation patch and a second branch structure 172 close to the second radiation patch. The first branch structure 171 may include a first branch and a second branch, wherein a first end of the first branch is connected to the ground layer, a second end of the first branch extends along a first direction Y, a first end of the second branch is connected to the second end of the first branch, and a second end of the second branch extends away from the first branch along a second direction X; the second branch structure 172 may include a third branch and a fourth branch, wherein a first end of the third branch is connected to the ground layer, a second end of the third branch extends along a first direction Y, a first end of the fourth branch is connected to the second end of the third branch, and a second end of the fourth branch extends away from the third branch along a second direction X.

In one aspect, for an antenna unit provided by the embodiment of the present disclosure, a meandering technology is used to provide a floor groove on a ground layer, which may reduce a surface wave current of the ground layer, reduce an influence of a mutual coupling effect (or a coupling effect) of an antenna, thereby avoiding deterioration of some characteristic parameters of the antenna caused by the mutual coupling effect and further improving isolation of the antenna. In another aspect, a branch structure is provided on the ground layer, and a shape and a structure of an edge of the ground layer may be changed, so that a current flows in a zigzag manner, which can not only increase an electrical length of the current, but also add new resonance points, thereby improving isolation of the antenna and expanding a bandwidth of the antenna. In this way, a performance of the antenna can be greatly enhanced. Furthermore, when the antenna unit is applied to a multi-input multi-output antenna or an array antenna, a miniaturized antenna with ultra-wideband and high isolation may be achieved.

Based on the foregoing embodiments, an embodiment of the present disclosure further provides an antenna unit. The antenna unit may be applied to the following scenario: an additional structure includes a patch meander structure disposed on a radiation patch and a branch structure disposed on a ground layer, the patch meander structure is achieved by a radiation groove, and a quantity of branch structures is two.

Figure 5:
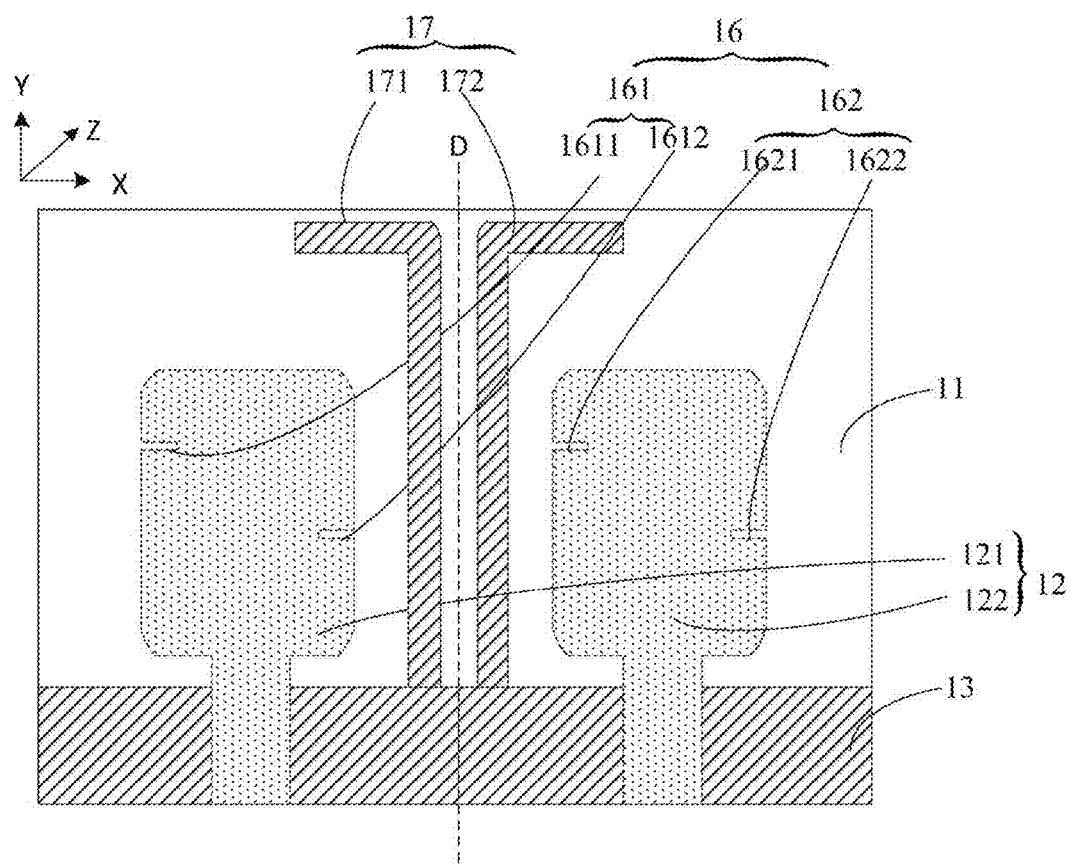
FIG. 5 is a schematic diagram of a fifth structure of an antenna unit according to an embodiment of the present disclosure.

In an exemplary embodiment, as shown in FIG. 5, the antenna unit may include a dielectric substrate 11, a radiation patch 12, a micro-strip feeder 14, a ground layer 13, and an additional structure.

The dielectric substrate 11 may include a first surface and a second surface; wherein the first surface and the second surface are opposite surfaces of the dielectric substrate 11.

The radiation patch 12 may include a first radiation patch 121 and a second radiation patch 122 that are located on the first surface of the dielectric substrate 11.

The micro-strip feeder 14 may include a first micro-strip feeder 141 and a second micro-strip feeder 142 that are located on the first surface of the dielectric substrate 11, the first micro-strip feeder 141 is connected to the first radiation patch 121, and the second micro-strip feeder 142 is connected to the second radiation patch 122.

The ground layer 13 is located on the second surface of the dielectric substrate 11.

The additional structure may include a patch meander structure 16 disposed on a radiation patch and a branch structure 17 disposed on a ground layer.

The patch meander structure may include a first radiation groove 161 on an edge of the first radiation patch 121 and a second radiation groove 162 on an edge of the second radiation patch 122, wherein, the first radiation groove 161 include a first groove 1611 located on a left edge of the first radiation patch 121 (located in the Y direction and away from the edge of the second radiation patch) and a second groove 1612 located on a right edge of the first radiation patch 121 (located in the Y direction and close to the edge of the second radiation patch), and the second radiation groove 162 include a third groove 1621 located on a left edge of the second radiation patch 122 (located in the Y direction and close to the edge of the first radiation patch) and a fourth groove 1622 located on a right edge of the second radiation patch 122 (located in the Y direction and away from the edge of the first radiation patch).

The branch structure 17 may include a first branch structure 171 close to the first radiation patch and a second branch structure 172 close to the second radiation patch. The first branch structure 171 may include a first branch and a second branch, wherein a first end of the first branch is connected to the ground layer, a second end of the first branch extends along a first direction Y, a first end of the second branch is connected to the second end of the first branch, and a second end of the second branch extends away from the first branch along a second direction X; the second branch structure 172 may include a third branch and a fourth branch, wherein a first end of the third branch is connected to the ground layer, a second end of the third branch extends along a first direction Y, a first end of the fourth branch is connected to the second end of the third branch, and a second end of the fourth branch extends away from the third branch along a second direction X.

In one aspect, for an antenna unit provided by the embodiment of the present disclosure, a meandering technology is used to provide a radiation groove on a radiation patch, a path of a current on a surface of the radiation patch is bent, thus extending an effective length of the path of the current, reducing a resonant frequency, and further increasing an electrical length of an antenna and expanding a bandwidth of the antenna. In another aspect, a branch structure is provided on a ground layer, and a shape and a structure of an edge of the ground layer may be changed, so that a current flows in a zigzag manner, which can not only increase an electrical length of the current, but also add new resonance points, thereby improving isolation of an antenna and expanding a bandwidth of the antenna. In this way, a performance of the antenna can be greatly enhanced. Furthermore, when the antenna unit is applied to a multi-input multi-output antenna or an array antenna, a miniaturized antenna with ultra-wideband and high isolation can be achieved.

A range of a size of the antenna unit will be described in detail below. A first direction Y is a direction away from a ground layer, and a second direction X is perpendicular to the first direction Y.

(1) A range of a size of a dielectric substrate may be: a ratio of a first length L_sub (distance characteristic in the first direction Y) of the dielectric substrate to a second length W_sub (distance characteristic in the second direction X) of the dielectric substrate may be 0.45 to 0.675; and a ratio of the first length L_sub (distance characteristic in the first direction Y) of the dielectric substrate to a thickness H_sub (distance characteristic in a third direction Z, which is perpendicular to the second direction X and the first direction Y) of the dielectric substrate may be 13.09 to 19.62.

(2) A range of a size of the ground layer may be: a ratio of a first length L_gnd of the ground layer (distance characteristic in the first direction Y) to the first length L_sub of the dielectric substrate (distance characteristic in the first direction Y) may be 0.18 to 0.26, and a ratio of the first length L_gnd of the ground layer (distance characteristic in the first direction Y) to a thickness H_gnd of the ground layer (distance characteristic in the third direction Z, which is perpendicular to the second direction X and the first direction Y) may be 91.43 to 137.15.

(3) A range of a size of a radiation patch may be: a ratio of a distance between a central position of a first radiation patch and a central position of a second radiation patch (distance characteristic in the second direction X), to a second length width W_sub of the dielectric substrate (distance characteristic in the second direction X) may be 0.4 to 0.6; and a ratio of a first length L of the first radiation patch (distance characteristic in the first direction Y) to a second length W of the dielectric substrate (distance characteristic in the second direction X) may be 1.03 to 1.54; wherein a size of the second radiation patch may be the same as a size of the first radiation patch.

(4) A range of a size of a radiation groove may be: a ratio of a first length L_slot of a first radiation groove (distance characteristic in the first direction Y) to a second length W_1 of the first radiation groove (distance characteristic in the second direction X) may be 2.4 to 3.6; wherein a size of the first radiation groove is the same a size of a second radiation groove.

(5) A range of a size of a floor groove may be: a ratio of a first length L_cut (distance characteristic in the first direction Y) of a second floor groove to a first length L_2 (distance characteristic in the first direction Y) of a first floor groove may be 1.12 to 1.68; a ratio of the first length L_cut (distance characteristic in the first direction Y) of the second floor groove to the length L_gnd (distance characteristic in the first direction Y) of the ground layer may be 0.7 to 0.95; a ratio of a second length W_cut (distance characteristic in the second direction X) of the second floor groove to a second length W_2 (distance characteristic in the second direction X) of the first floor groove may be 0.21 to 0.32; a size of a third floor groove may be the same as a size of the first floor groove; a ratio of a distance L_3 between a lower edge of the first radiation patch and a bottom of the first floor groove, to a first length L2 (distance characteristic in the first direction Y) of the first floor groove may be 1.1 to 1.44; and a ratio of a second length W_2 of the first floor groove to a second length W_f of a first micro-strip feeder may be between 1.8 to 2.7.

A ratio of the first length L_cut (distance characteristic in the first direction Y) of the second floor groove to a first length of the third floor groove may be 1.12 to 1.68, and a ratio of the second length W_cut (distance characteristic in the second direction X) to a second length of the third floor groove may be 0.21 to 0.32; a ratio of a distance between a lower edge of the second radiation patch and a bottom of the third floor groove, to the first length of the third floor groove may be 1.1 to 1.44, and a ratio of the second length of the third floor groove to a second length of a second micro-strip feeder may be 1.8 to 2.7.

(6) A range of a size of a micro-strip feeder may be: a ratio of a distance L_3 between a lower edge of a radiation patch (an edge close to the ground layer) and a bottom of the first floor groove, to a first length of the micro-strip feeder (distance characteristic in the first direction Y) may be 0.53 to 0.8. A ratio of the first length of the micro-strip feeder to a second length W_f of the micro-strip feeder (distance characteristic in the second direction X) may be 1.8 to 2.7.

(7) A range of a size of a branch structure may be: a ratio of a first length L_4 of a first branch (distance characteristic in the first direction Y) to the first length L of the first radiation patch (distance characteristic in the first direction Y) may be 1.19 and 1.78; a ratio of the first length L_4 of the first branch (distance characteristic in the first direction Y) to a second length L_5 of a second branch (distance characteristic in the second direction X) may be between 5.36 and 8.04; a ratio of the second length L_5 of the second branch (distance characteristic in the second direction X) to a second length W_3 of the first branch (distance characteristic in the second direction X) may be 2.67 to 4.

A ratio of a first length of a third branch (distance characteristic in the first direction Y) to a first length of the second radiation patch (distance characteristic in the first direction Y) may be 1.19 to 1.78, a ratio of the first length of the third branch (distance characteristic in the first direction Y) to a second length of a fourth branch (distance characteristic in the second direction X) may be 5.36 to 8.04; a ratio of the second length of the fourth branch (distance characteristic in the second direction X) to a second length of the third branch (distance characteristic in the second direction X) may be 2.67 to 4.

(8) Other dimensional parameters.

Corners of the branch structure and the radiation patch may adopt arc chamfers, and a radius of an arc chamfer may be equal to the second length W_3 of the first branch (distance characteristic in the second direction X).

A ratio of a distance between a central position of the first radiation patch and a central position of the second radiation patch (distance characteristic in the second direction X), to a width W_sub of the dielectric substrate (distance characteristic in the second direction X) may be 0.4 to 0.6.

In an exemplary embodiment, a size (unit: mm) of each structure in the antenna unit shown in FIGS. 1 and 2 may be as follows.

(1) Sizes of the dielectric substrate may be as follows: L_sub=18, W_sub=32, and H_sub=1.1, wherein L_sub represents a first length (distance characteristic in the first direction Y), W_sub represents a second length (distance characteristic in the second direction X), and H_sub represents a thickness (distance characteristic in the third direction Z, which is perpendicular to the second direction X and the first direction Y) of the dielectric substrate.

(2) Sizes of the ground layer may be: L_gnd=4 and H_gnd=0.035, wherein L_gnd represents the first length L_gnd of the ground layer (distance characteristic in the first direction Y), H_gnd represents the thickness of the ground layer (distance characteristic in the third direction Z, which is perpendicular to the second direction X and the first direction Y), and a second length of the ground layer (distance characteristic in the second direction X) is the same as the second length W_sub (distance characteristic in the second direction X) of the dielectric substrate.

(3) Sizes of a radiation patch may be L=9 and W=7, wherein L represents a first length of the radiation patch (distance characteristic in the first direction Y) and W represents a second length of the radiation patch (distance characteristic in the second direction X).

(4) Sizes of a radiation groove may be: L_slot=0.6 and W_1=0.2, wherein L_slot represents the first length of the first radiation groove (distance characteristic in the first direction Y) and W_1 represents the second length of the first radiation groove (distance characteristic in the second direction X), and sizes of the first radiation groove are the same as that of the second radiation groove.

(5) Sizes of a floor groove may be: L_2=2.5 and W_2=4.5, wherein L_2 represents the first length of the first floor groove (distance characteristic in the first direction Y), W_2 represents the second length of the first floor groove (distance characteristic in the second direction X), and sizes of the third floor groove are the same as that of the first floor groove; L_cut=3.5 and W_cut=1.2, wherein L_cut represents the first length of the second floor groove (distance feature in the first direction Y) and W_cut represents the second length of the second floor groove (distance feature in the second direction X).

(6) Sizes of a micro-strip feeder may be as follows: L_3=3 and W_f=2, wherein L_3 represents a distance between a lower edge of a radiation patch and a bottom of a first floor groove, and W_f represents a width of the micro-strip feeder.

(7) Sizes of a branch structure may be W_3=0.6 and L_5=2, wherein W_3 represents a width of a first branch, L_5 represents a second length of a second branch (distance characteristic in the second direction X), a first length of a second branch (distance characteristic in the first direction Y) and a second length of the first branch (distance in the second direction X) may be the same, sizes of a third branch may be the same as that of the first branch, and sizes of the fourth branch may be the same as that of the second branch.

(8) Other size parameters: corners of the branch structure and the radiation patch may adopt arc chamfers, and a radius of an arc chamfer may be 0.6; a distance between the central position of the first radiation patch and the central position of the second radiation patch may be 16; the dielectric substrate may be an FR-4 substrate, a dielectric constant may be 4.4, and a loss tangent value may be 2.2.

Next, a performance of an antenna unit will be explained with simulation results of the antenna unit.

FIGS. 6A to 6D show the simulation results of the antenna unit shown in FIG. 2, which are explained as follows.

Figure 6A:
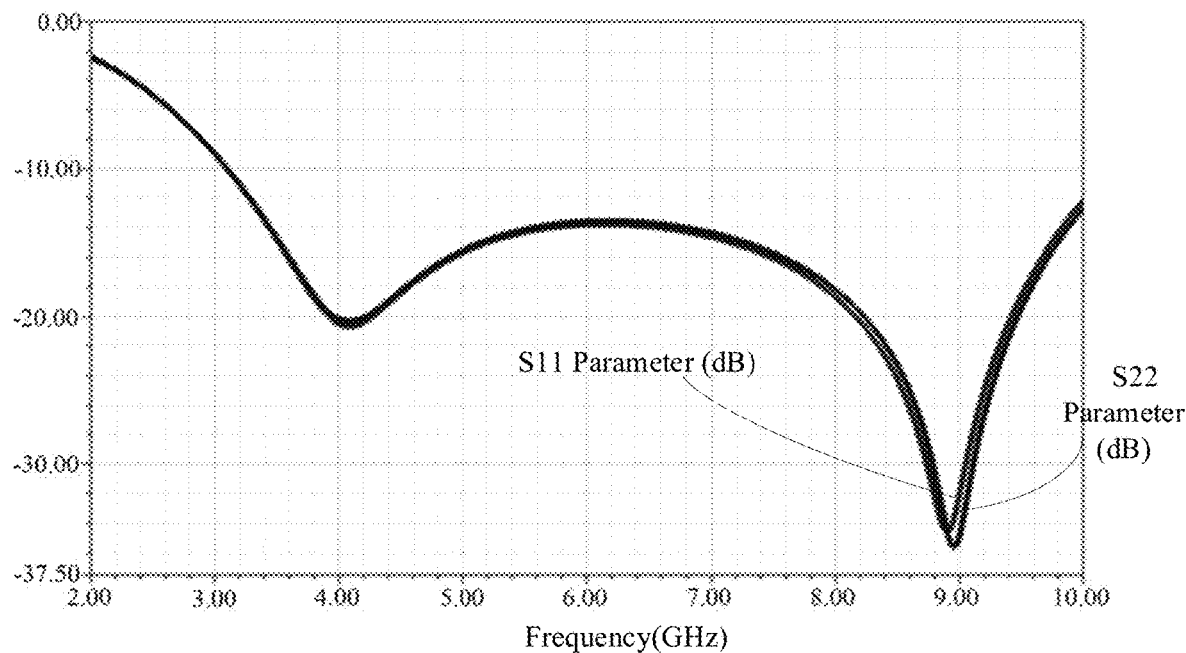
FIGS. 6A to 6D are schematic diagrams of simulation results of an antenna unit according to embodiments of the present disclosure.

FIG. 6A shows a reflection coefficient S11 parameter and a reflection coefficient S22 parameter in a scattering parameter S of the antenna unit, and as shown in FIG. 6A, the scattering parameter S of the antenna unit is less than −10 dB (decibel) from 3 GHz (gigahertz) to 10 GHz. Furthermore, parameters of reflection coefficient S11 and reflection coefficient S22 at two resonance points (4 GHz and 9 GHz) of the antenna unit are both less than −20 dB. Therefore, it may be explained that the antenna unit is indeed an ultra-wideband antenna.

Figure 6B:
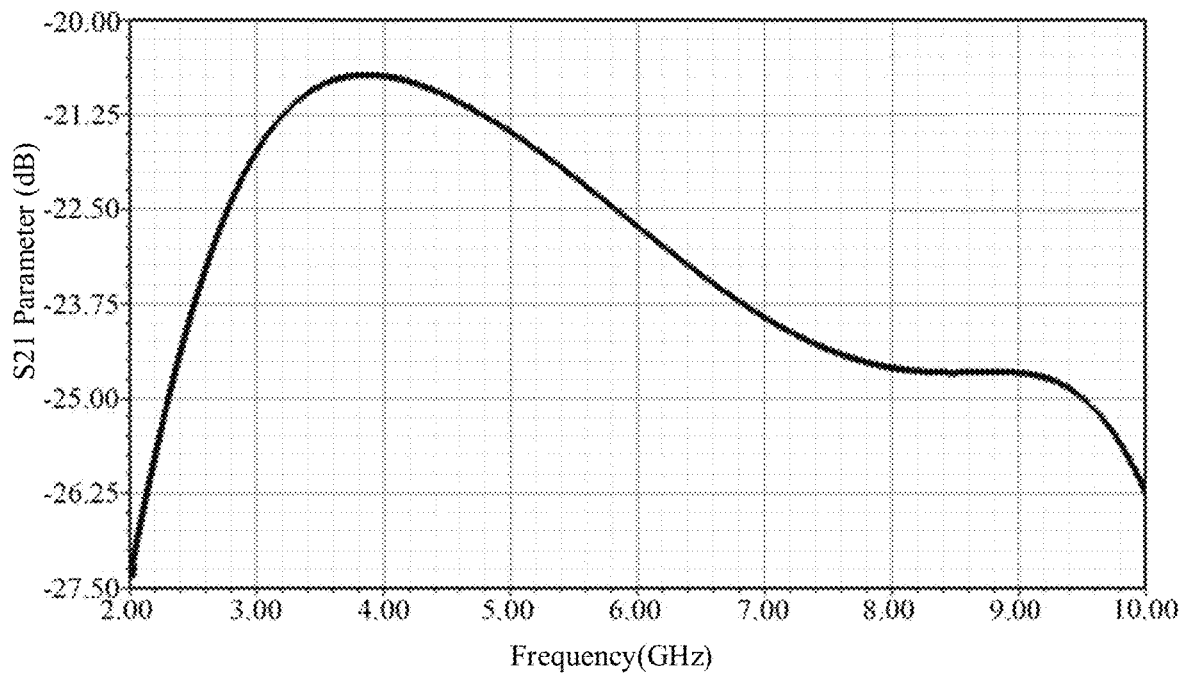

FIG. 6B shows scattering parameter S21 parameters of two ports of the antenna unit (used to characterize isolation between two feeding ports of an antenna). As shown in FIG. 6B, S21 parameters are all less than −20 dB in a working frequency band of the antenna unit. Therefore, it may be explained that isolation of ports of the antenna unit is very good.

Figure 6C:
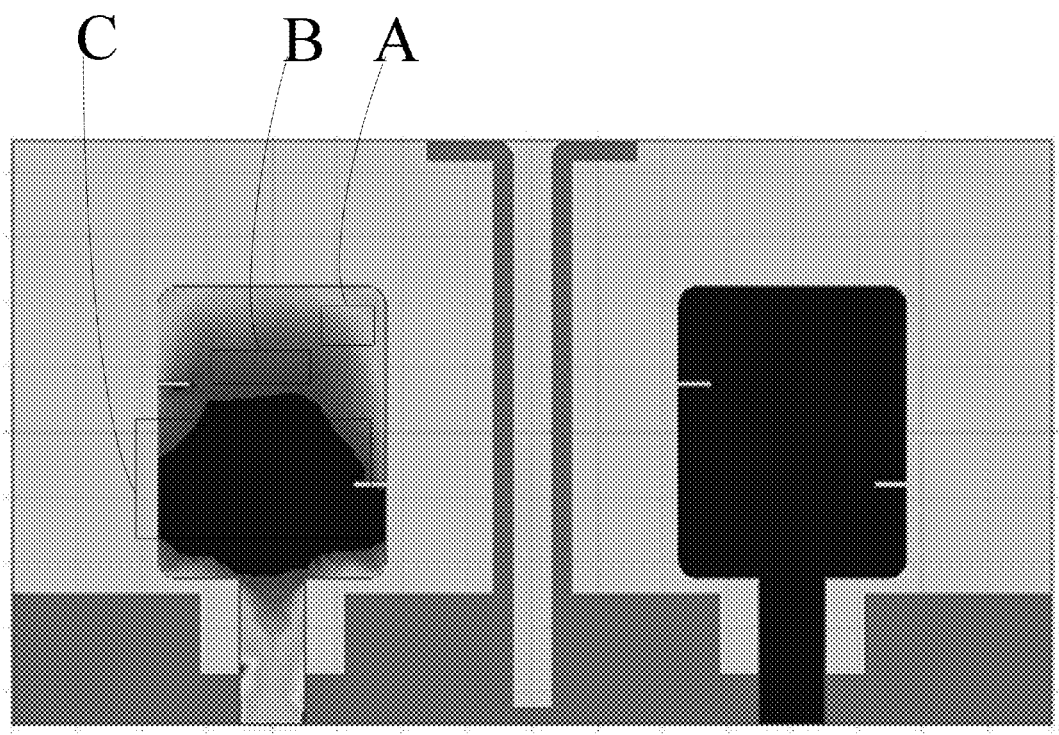

In practical application, an essence of studying an antenna is to study distribution characteristics of a current on a surface of the antenna. FIG. 6C shows a diagram of a current distribution of an antenna unit line at a frequency point of 6 GHz. As shown in FIG. 6C, it may be clearly seen that an electric field intensity in region A is greater than an electric field intensity in region B, and the electric field intensity in region B is greater than that in region C. Therefore, by feeding only a left port (i.e., a port formed by a ground layer and a first micro-strip feeder), it may be seen that there is no obvious current distribution on a right port (i.e., a port formed by the ground layer and a second micro-strip feeder) and a second radiation patch, thus it may be explained that isolation of ports of the antenna unit is indeed quite good.

Figure 6D:
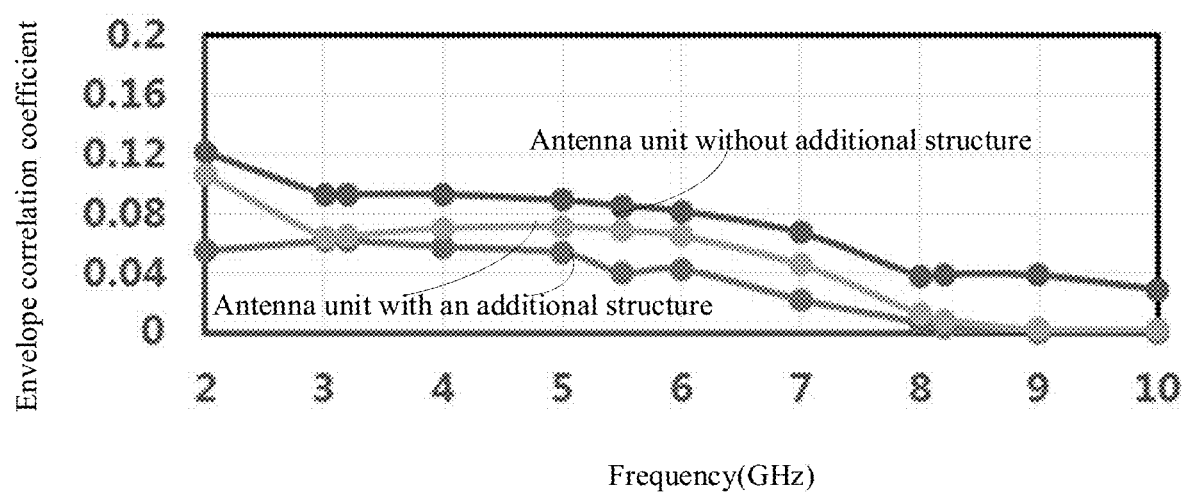

In practical applications, an envelope correlation coefficient (ECC) is usually used to measure a coupling degree between directional maps of different radiation patches in an antenna unit. The smaller an ECC value is, the stronger an independence of each channel of an antenna is and the lower a correlation is. FIG. 6D shows a relationship between the envelope correlation coefficient and a frequency of the antenna unit. As shown in FIG. 6D, ECC values of the antenna unit in a working frequency band are all less than 0.06. Therefore, it may be seen that an additional structure in the antenna unit mainly reduces coupling at a low frequency, this is because an electrical length of a distance between two radiation patches is small at a low frequency and a coupling effect is obvious. Therefore, it may be explained that isolation of ports of the antenna unit is very good.

A structure of an antenna unit is described below through an example of a preparation process of the antenna unit.

Firstly, the preparation process is explained by taking the above antenna unit being a rigid antenna unit as an example.

An embodiment of the present disclosure further provides a preparation method of an antenna unit, which is applicable in the following scenario: a dielectric substrate is a rigid dielectric substrate, and an additional structure includes a patch meander structure provided on a radiation patch, a floor meander structure provided on a ground layer, and a branch structure provided on the ground layer.

Figure 7:
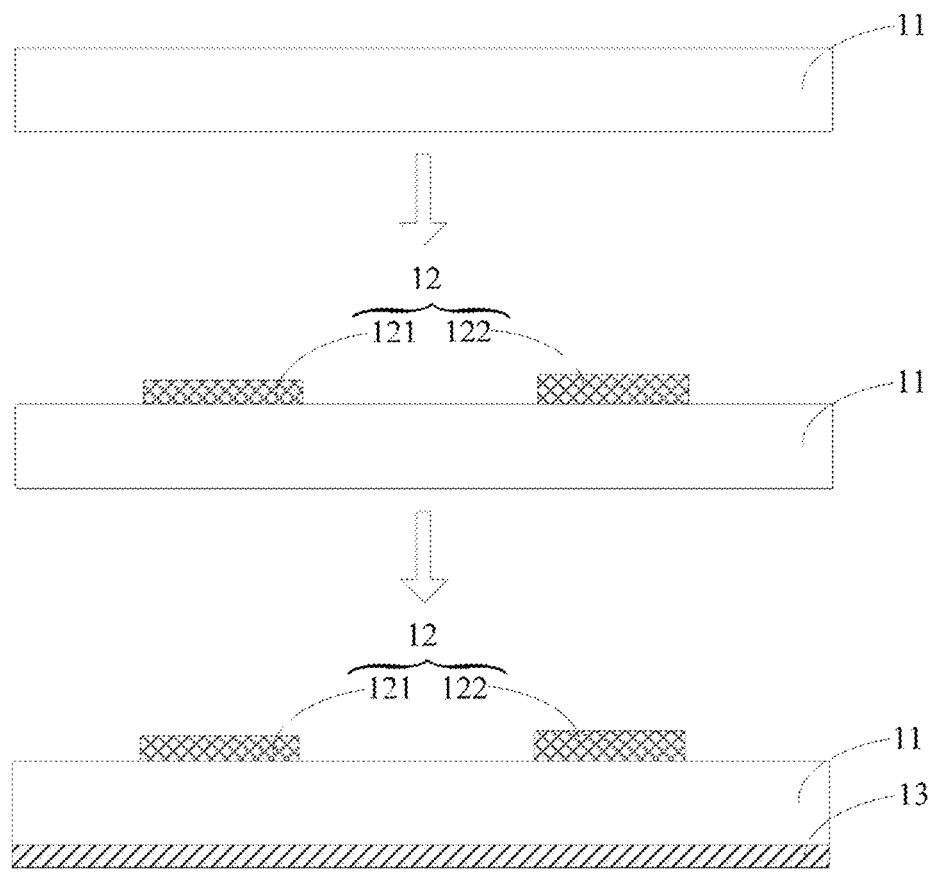
FIG. 7 is a schematic flowchart of a preparation method of an antenna unit according to an embodiment of the present disclosure.

FIG. 7 is a schematic flowchart of a preparation method of an antenna unit according to an embodiment of the present disclosure. As shown in FIG. 7, the preparation method includes following acts.

Act 701: providing a dielectric substrate 11.

Act 702: forming a radiation patch 12 and a micro-strip feeder (not shown in FIG. 7) on an upper surface of the dielectric substrate, and forming a patch meander structure (not shown in FIG. 7) on the radiation patch.

Here, the radiation patch, the micro-strip feeder, and the patch meander structure are consistent with those described in one or more of the previous embodiments, and will not be described in detail here.

In an exemplary embodiment, the dielectric substrate may be an FR-4 substrate.

In an exemplary embodiment, a method for forming the radiation patch, the micro-strip feeder, and the patch meander structure may be to form an entire metal layer on the upper surface of the dielectric substrate through magnetron sputtering, thermal evaporation, and electroplating, and then pattern the metal layer to form the radiation patch, the micro-strip feeder, and the radiation groove.

In an exemplary embodiment, a patterning method may be a method such as etching.

Act 703: forming a ground layer 13 on a lower surface of the dielectric substrate 11, and forming a floor meander structure and a branch structure (not shown in the figure) on the ground layer 13.

Here, the ground layer, the floor meander structure, and the branch structure are consistent with those described in one or more of the previous embodiments, and will not be described in detail here.

In an exemplary embodiment, a method for forming the ground layer, the floor meander structure, and the branch structure may be to form an entire metal layer on the lower surface of the dielectric substrate through magnetron sputtering, thermal evaporation, and electroplating, and then pattern the metal layer to form the ground layer, a floor groove, and the branch structure.

In an exemplary embodiment, a patterning method may be a method such as etching.

In this way, a rigid antenna unit provided with a patch meander structure, a floor meander structure, and a branch structure may be obtained by completing the preparation process of the antenna unit of the embodiment of the present disclosure. In this way, in one aspect, a meandering technology is used to provide a floor meander structure on a ground layer, which may reduce a surface wave current of the ground layer, reduce an influence of a mutual coupling effect (or a coupling effect) of an antenna, and further improve isolation of the antenna. In another aspect, a meandering technology is used to provide a patch meander structure on a radiation patch, which may bend a path of a current on a surface of the radiation patch, thus extending an effective length of the path of the current, reducing a resonant frequency, and further increasing an electrical length of an antenna and expanding a bandwidth of the antenna. In yet another aspect, a branch structure is provided on a ground layer, and a shape and a structure of an edge of the ground layer may be changed, so that a current flows in a zigzag manner, which can not only increase an electrical length of the current, but also add new resonance points, thereby improving isolation of an antenna and expanding a bandwidth of the antenna. In this way, a performance of the antenna can be greatly enhanced. In addition, a thickness of a rigid dielectric substrate may be made thicker, hardness is better, stability is better, an insulation effect is better, and microwave loss is low, thereby transmission of radio signals or electromagnetic waves is hardly affected adversely, and the performance of the antenna can be further improved.

Then, a preparation process is explained by taking the above antenna unit being a flexible antenna unit as an example.

An embodiment of the present disclosure further provides a preparation method of an antenna unit, which is applicable in the following scenario: a dielectric substrate is a flexible dielectric substrate, and an additional structure includes a patch meander structure provided on a radiation patch, a floor meander structure provided on a ground layer, and a branch structure provided on the ground layer.

Figure 8:
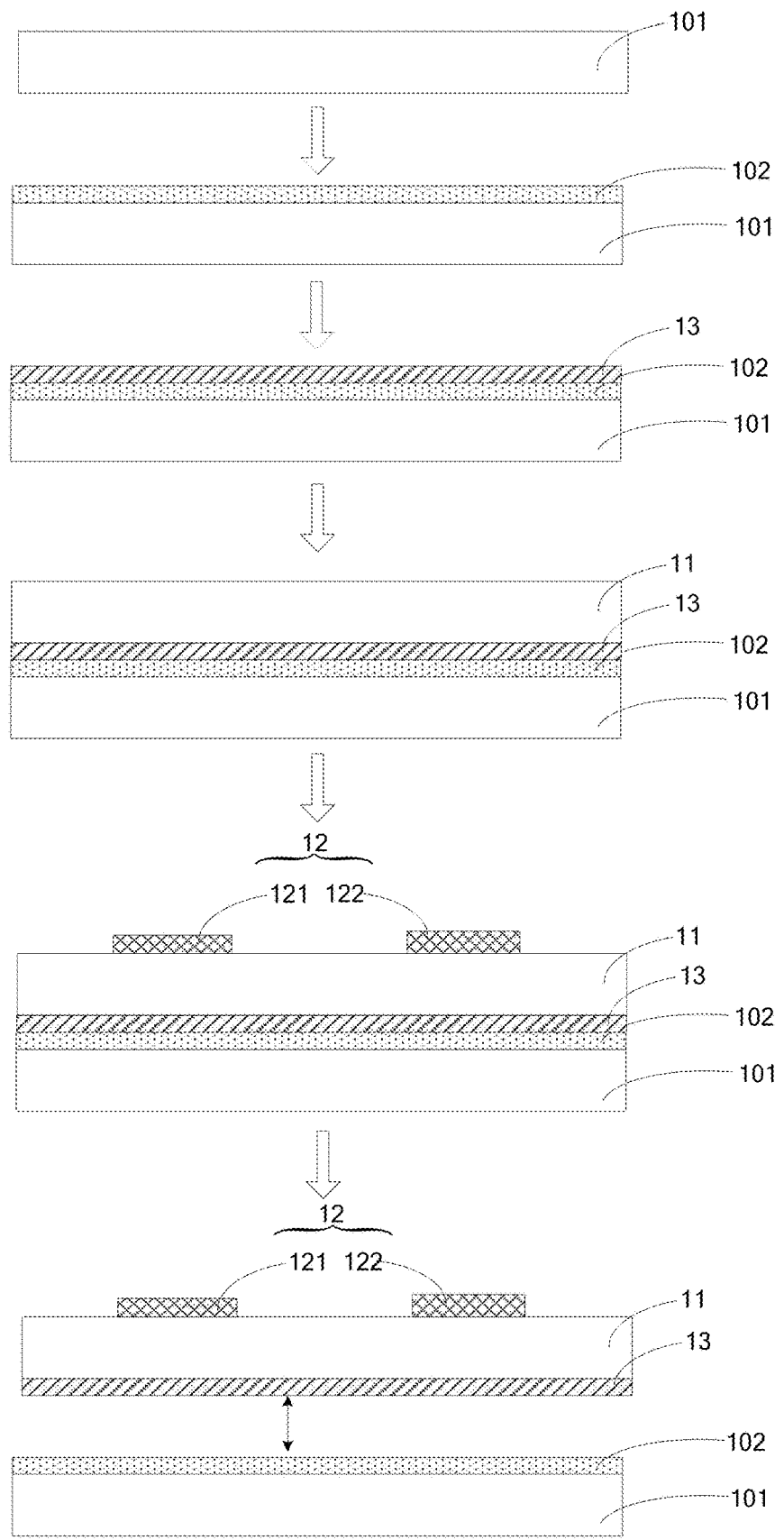
FIG. 8 is another schematic flowchart of a preparation method of an antenna unit according to an embodiment of the present disclosure.

FIG. 8 is another schematic flowchart of a preparation method of an antenna unit according to an embodiment of the present disclosure. As shown in FIG. 8, the preparation method includes following acts.

Act 801: providing a glass substrate 101.

Act 802: forming a de-bonding layer (DBL) 102 on an upper surface of the glass substrate 101.

Act 803, forming a ground layer 13 on an upper surface of the DBL layer 102 (a surface away from the glass substrate), and forming a floor meander structure and a branch structure (not shown in the figure) on the ground layer 13.

Here, the ground layer, the floor meander structure, and the branch structure are consistent with those described in one or more of the previous embodiments, and will not be described in detail here.

In an exemplary embodiment, a method for forming the ground layer, the floor meander structure, and the branch structure may be to form an entire metal layer on a lower surface of a dielectric substrate through magnetron sputtering, thermal evaporation, and electroplating, and then pattern the metal layer to form the ground layer, a floor groove, and the branch structure.

In an exemplary embodiment, a patterning method may be a method such as etching.

Act 804: forming a flexible dielectric substrate 11 on an upper surface (a surface away from the glass substrate) of the ground layer 13, the floor meander structure, and the branch structure.

In an exemplary embodiment, a flexible dielectric substrate may be a PI substrate.

Act 805: forming a radiation patch 12 and a micro-strip feeder (not shown in the figure) on an upper surface of the flexible dielectric substrate 11 (a surface away from the glass substrate), wherein a patch meander structure (not shown in the figure) is formed on the radiation patch 12.

Here, the radiation patch, the micro-strip feeder, and the patch meander structure are consistent with those described in one or more of the previous embodiments, and will not be described in detail here.

In an exemplary embodiment, a method for forming the radiation patch, the micro-strip feeder, and the patch meander structure may be to form an entire metal layer on the upper surface of the dielectric substrate through magnetron sputtering, thermal evaporation, and electroplating, and then pattern the metal layer to form the radiation patch, the micro-strip feeder, and a radiation groove.

In an exemplary embodiment, a patterning method may be a method such as etching.

Act 806: stripping the DBL layer 102 and the glass substrate 101 to separate the DBL layer 102 from the ground layer 13 on the lower surface of the flexible dielectric substrate 11 to obtain an antenna unit.

In this way, a flexible antenna unit provided with a patch meander structure, a floor meander structure, and a branch structure may be obtained by completing the preparation process of the antenna unit of the embodiment of the present disclosure. In one aspect, a floor meander structure is provided on a ground layer, which may reduce a surface wave current of the ground layer, reduce an influence of a mutual coupling effect of an antenna, and further improve isolation of the antenna. A patch meander structure is provided on a radiation patch, which may bend a path of a current on a surface of the radiation patch, thus extending an effective length of the path of the current, reducing a resonant frequency, and further increasing an electrical length of an antenna and expanding a bandwidth of the antenna. Then, a branch structure is provided on the ground layer, and a shape and a structure of an edge of the ground layer may be changed, so that a current flows in a zigzag manner, which can not only increase an electrical length of the current, but also add new resonance points, thereby improving isolation of the antenna and expanding a bandwidth of the antenna. In this way, a performance of the antenna can be improved by providing the patch meander structure, the floor meander structure, and the branch structure. On the other hand, characteristics of a DBL layer may be used to strip and separate a metal layer on a lower surface of a dielectric substrate from a glass substrate, and a flexible antenna unit is prepared and obtained, which has better flexibility, lighter weight, and better impact resistance. When the antenna unit is applied to an electronic device or a multi-input multi-output antenna including the antenna unit is applied to an electronic device, a limitation of a shape or size of the electronic device on the antenna unit may be reduced, and the antenna unit may be better integrated with other components in the electronic device.

In an exemplary embodiment, taking a dielectric substrate being a flexible dielectric substrate as an example, and an additional structure includes a floor meander structure on a ground layer and a patch meander structure on a radiation patch, a preparation method of an antenna unit may include providing a glass substrate; forming a DBL layer on an upper surface of the glass substrate; forming a ground layer and a floor meander structure on an upper surface of the DBL layer 102; providing a flexible dielectric substrate (such as a PI substrate) on an upper surface of the ground layer; forming a radiation patch and a micro-strip feeder on an upper surface of a flexible dielectric substrate, and forming a patch meander structure on the radiation patch; and stripping the DBL layer and the glass substrate to separate the DBL layer from the ground layer on a lower surface of the flexible dielectric substrate to obtain an antenna unit.

Of course, the above examples are only illustrative descriptions of the preparation process of the antenna unit in the embodiments of the present disclosure. Those skilled in the art may design according to actual needs, refer to the above preparation method, and prepare other flexible antenna units according to different additional structures that need to be added. Here, the embodiments of the present disclosure will not be enumerated too much.

It should be pointed out here that the above description of the embodiments of the above preparation method is similar to that of the above embodiments of the antenna unit, and has similar beneficial effects as the embodiments of the antenna unit. For technical details not disclosed in the embodiments of the preparation method of the present disclosure, please refer to the description of the embodiments of the antenna unit of the present disclosure for understanding.

An embodiment of the present disclosure further provides a multiple-input multiple-output antenna, which includes at least one antenna unit in one or more of the above embodiments.

An embodiment of the present disclosure further provides an electronic device, which includes the antenna unit in one or more of the above embodiments.

In an exemplary embodiment, the electronic device may include, but is not limited to, any products or components with communication functions such as a mobile phone, a tablet computer, a television, a laptop computer, and a navigator.

It should be pointed out here that the description of the above embodiments of the multiple-input multiple-output antenna and electronic device is similar to that of the above embodiments of the antenna unit, and has similar beneficial effects as the embodiments of the antenna unit. For technical details not disclosed in the embodiments of the multiple-input multiple-output antenna and electronic device of the present disclosure, please refer to the description of the embodiments of the antenna unit of the present disclosure for understanding.

For clarity, a thickness and a size of a layer or a microstructure are magnified in the accompanying drawings used for describing the embodiments of the present invention. It may be understood that when an element, such as a layer, a film, area region, or a substrate, is referred to as being located "above" or "below" another element, the element may be "directly" located "above" or "below" another element, or an intermediate element may exist.

In the drawings, a size of each constituent element, or a thickness or region of a layer, is sometimes exaggerated for clarity. Therefore, an implementation of the present disclosure is not necessarily limited to the size shown, and a shape and a size of each component in the drawings do not reflect true proportions. In addition, the drawings schematically show ideal examples, and an implementation of the present disclosure is not limited to shapes or values shown in the drawings.

The ordinal numbers "first", "second", "third" and the like in this specification are used to avoid confusion between constituent elements, but not to constitute limitations on quantities.

In this specification, for sake of convenience, wordings, such as "central", "upper", "lower", "front", "rear", "vertical", "horizontal", "top", "bottom", "inner", "outer" and the like which are used to indicate orientations or positional relations, to describe positional relations between constituent elements with reference to the drawings, are only for a purpose of facilitating description of this specification and simplifying the description, rather than indicating or implying that an apparatus or element referred to must have a specific orientation, or must be constructed and operated in a particular orientation, and therefore may not be construed as limitations on the present disclosure. The positional relations of the constituent elements may be appropriately changed according to a direction in which each constituent element is described. Therefore, the wordings are not limited in the specification, and may be replaced appropriately according to situations.

In this specification, terms "install", "connect", and "couple" shall be understood in a broad sense unless otherwise explicitly specified and defined. For example, it may be a fixed connection, a detachable connection, or an integrated connection, may be a mechanical connection or an electrical connection, or may be a direct connection, an indirect connection performed via an intermediate component, or internal communication of two components. For those skilled in the art, the meanings of the above terms in the present disclosure may be understood according to situations.

In this specification, "parallel" refers to a state in which an angle formed by two straight lines is above −10 degrees and below 10 degrees and thus, includes a state in which the angle is above −5 degrees and below 5 degrees. In addition, "perpendicular" refers to a state in which an angle formed by two straight lines is above 80 degrees and below 100 degrees, and thus may include a state in which the angle is above 85 degrees and below 95 degrees. "About" in the present disclosure means that limits are not made strictly, and values within a range of process and measurement errors are allowable.

The embodiments of the present invention, i.e., features in the embodiments may be combined with each other to obtain new embodiments if there is no conflict.

Multiple embodiments are described in the present disclosure. However, the description is exemplary and unrestrictive. Moreover, it is apparent to those of ordinary skill in the art that there may be more embodiments and implementation solutions in the scope of the embodiments described in the present disclosure. Although many possible feature combinations are shown in the drawings and discussed in the implementation modes, many other combinations of the disclosed features are also possible. Unless specifically restricted, any feature or element of any embodiment may be combined with any other feature or element in any other embodiment for use, or may take place of any other feature or element in any other embodiment.

What is claimed is:

1. An antenna unit, comprising: a dielectric substrate, an antenna layer, a ground layer, and an additional structure configured to improve antenna performance;
the antenna layer is disposed on a first surface of the dielectric substrate;
the ground layer is disposed on a second surface of the dielectric substrate;
the first surface and the second surface are opposite surfaces of the dielectric substrate;
the additional structure comprises any combination of the following structures: a floor meander structure disposed on the second surface and in a same layer as the ground layer to improve isolation of an antenna, a patch meander structure disposed on the first surface and in a same layer as the antenna layer to expand a bandwidth of an antenna, and a branch structure disposed on the second surface and in a same layer as the ground layer to improve isolation of an antenna and expand a bandwidth of the antenna.

2. The antenna unit according to claim 1, wherein the branch structure comprises a first branch structure and a second branch structure; wherein,
the first branch structure comprises a first branch and a second branch, wherein a first end of the first branch is connected to the ground layer, a second end of the first branch extends along a first direction, a first end of the second branch is connected to the second end of the first branch, and a second end of the second branch extends away from the first branch along a second direction, wherein the first direction is a direction away from the ground layer, and the second direction crosses the first direction;
the second branch structure comprises a third branch and a fourth branch, wherein a first end of the third branch is connected to the ground layer, a second end of the third branch extends along the first direction, a first end of the fourth branch is connected to the second end of the third branch, and a second end of the fourth branch extends away from the third branch along the second direction.

3. The antenna unit according to claim 2, wherein a ratio of a second length of the second branch to a second length of the first branch is 2.67 to 4, wherein the second length of the second branch and the second length of the first branch are distance characteristics in the second direction.

4. The antenna unit according to claim 2, wherein shapes of the first branch, the second branch, the third branch, and the fourth branch are rectangular or trapezoidal.

5. The antenna unit according to claim 2, wherein the dielectric substrate has a center line extending along the first direction, and the first branch structure and the second branch structure are symmetrical with respect to the center line of the dielectric substrate.

6. The antenna unit according to claim 1, wherein the antenna layer comprises a radiation patch and a micro-strip feeder;
the radiation patch comprises a first radiation patch and a second radiation patch;
the micro-strip feeder comprises a first micro-strip feeder and a second micro-strip feeder; wherein the first micro-strip feeder is connected to the first radiation patch and configured to feed the first radiation patch, and the second micro-strip feeder is connected to the second radiation patch and configured to feed the second radiation patch;
the patch meander structure comprises at least one of a first radiation groove disposed on the first radiation patch and a second radiation groove disposed on the second radiation patch.

7. The antenna unit according to claim 6, wherein the first radiation patch comprises a first edge, a second edge, a third edge, and a fourth edge which are connected in sequence, wherein the first edge is an edge in a first direction and away from the second radiation patch, the second edge is an edge in a second direction and away from the ground layer, the third edge is an edge in the first direction and close to the second radiation patch, and the fourth edge is an edge in the second direction and close to the ground layer; wherein the first edge and the third edge are opposite sides, the second edge and the fourth edge are opposite sides, the first direction is a direction away from the ground layer, and the second direction crosses the first direction;
the second radiation patch comprises a fifth edge, a sixth edge, a seventh edge, and an eighth edge which are connected in sequence, wherein the fifth edge is an edge in the first direction and close to the first radiation patch, the sixth edge is an edge in the second direction and away from the ground layer, the seventh edge is an edge in the first direction and away from the first radiation patch, and the eighth edge is an edge in the second direction and close to the ground layer, wherein the fifth edge and the seventh edge are opposite sides, the sixth edge and the eighth edge are opposite sides, and the fifth edge is opposite to the third edge;
the first radiation groove comprises at least one of a groove disposed on the first edge, a groove disposed on the second edge, a groove disposed on the third edge, and a groove disposed on the fourth edge; and
the second radiation groove comprises at least one of a groove disposed on the fifth edge, a groove disposed on the sixth edge, a groove disposed on the seventh edge, and a groove disposed on the eighth edge.

8. The antenna unit according to claim 7, wherein a disposing mode of the patch meander structure comprises one or more of the following modes:
a distance between a lower edge of the groove disposed on the first edge and the fourth edge is greater than a distance between a lower edge of the groove disposed on the third edge and the fourth edge, a distance between the groove disposed on the fifth edge and the eighth edge is greater than a distance between the groove disposed on the seventh edge and the eighth edge, a distance between a lower edge of the groove disposed on the first edge and the fourth edge equals to a distance between the groove disposed on the fifth edge and the eighth edge, and a distance between a lower edge of the groove disposed on the third edge and the fourth edge equals to a distance between the groove disposed on the seventh edge and the eighth edge.

9. The antenna unit according to claim 6, wherein a ratio of a first length of the first radiation groove to a second length of the first radiation groove is 2.4 to 3.6, and/or a ratio of a first length of the second radiation groove to a second length of the second radiation groove is 2.4 to 3.6; wherein the first length of the first radiation groove and the first length of the second radiation groove are distance characteristics in a first direction, the second length of the first radiation groove and the second length of the second radiation groove are distance characteristics in a second direction, wherein the first direction is a direction away from the ground layer, and the second direction crosses the first direction.

10. The antenna unit according to claim 1, wherein the antenna layer comprises a radiation patch and a micro-strip feeder;
the radiation patch comprises a first radiation patch and a second radiation patch;
the micro-strip feeder comprises a first micro-strip feeder and a second micro-strip feeder; wherein the first micro-strip feeder is connected to the first radiation patch and configured to feed the first radiation patch, and the second micro-strip feeder is connected to the second radiation patch and configured to feed the second radiation patch;
the floor meander structure comprises at least one of a first floor groove corresponding to the first micro-strip feeder, a second floor groove disposed between the first micro-strip feeder and the second micro-strip feeder, and a third floor groove corresponding to the second micro-strip feeder.

11. The antenna unit according to claim 10, wherein a size of the floor meander structure comprises one or more of the following:
a ratio of a first length of the second floor groove to a first length of the first floor groove is 1.12 to 1.68, a ratio of the first length of the second floor groove to a first length of the ground layer is 0.7 to 0.95, a ratio of a second length of the second floor groove to a second length of the first floor groove is 0.21 to 0.32, a ratio of a distance between a lower edge of the first radiation patch close to the ground layer and a bottom of the first floor groove, to the first length of the first floor groove is 1.1 to 1.44, a ratio of the second length of the first floor groove to a second length of the first micro-strip feeder is 1.8 to 2.7, a ratio of the first length of the second floor groove to a first length of the third floor groove is 1.12 to 1.68, a ratio of the second length of the second floor groove to a second length of the third floor groove is 0.21 to 0.32, a ratio of a distance between a lower edge of the second radiation patch close to the ground layer and a bottom of the third floor groove, to the first length of the third floor groove is 1.1 to 1.44, and a ratio of the second length of the third floor groove to a second length of the second micro-strip feeder is 1.8 to 2.7;
wherein first lengths of the first floor groove, the second floor groove, the third floor groove, and the ground layer are distance characteristics in a first direction, and second lengths of the first radiation groove, the second radiation groove, the third floor groove, the first micro-strip feeder, and the second micro-strip feeder are distance characteristics in a second direction, wherein the first direction is a direction away from the ground layer, and the second direction crosses the first direction.

12. The antenna unit according to claim 10, wherein shapes of the first floor groove, the second floor groove, and the third floor groove are rectangular or trapezoidal.

13. The antenna unit according to claim 6, wherein a ratio of a distance between a central position of the first radiation patch and a central position of the second radiation patch, to a second length of the dielectric substrate is 0.4 to 0.6, and the second length of the dielectric substrate is a distance characteristic in a second direction, wherein a first direction is a direction away from the ground layer, and the second direction crosses the first direction.

14. The antenna unit according to claim 10, wherein a ratio of a distance between a central position of the first radiation patch and a central position of the second radiation patch, to a second length of the dielectric substrate is 0.4 to 0.6, and the second length of the dielectric substrate is a distance characteristic in a second direction, wherein a first direction is a direction away from the ground layer, and the second direction crosses the first direction.

15. An electronic device, comprising an antenna unit, the antenna unit comprising: a dielectric substrate, an antenna layer, a ground layer, and an additional structure configured to improve antenna performance; wherein
the antenna layer is disposed on a first surface of the dielectric substrate;
the ground layer is disposed on a second surface of the dielectric substrate;
the first surface and the second surface are opposite surfaces of the dielectric substrate;
the additional structure comprises any combination of the following structures: a floor meander structure disposed on the second surface and in a same layer as the ground layer to improve isolation of an antenna, a patch meander structure disposed on the first surface and in a same layer as the antenna layer to expand a bandwidth of an antenna, and a branch structure disposed on the second surface and in a same layer as the ground layer to improve isolation of an antenna and expand a bandwidth of the antenna.

16. The electronic device according to claim 15, wherein the branch structure comprises a first branch structure and a second branch structure; wherein,
the first branch structure comprises a first branch and a second branch, wherein a first end of the first branch is connected to the ground layer, a second end of the first branch extends along a first direction, a first end of the second branch is connected to the second end of the first branch, and a second end of the second branch extends away from the first branch along a second direction, wherein the first direction is a direction away from the ground layer, and the second direction crosses the first direction;
the second branch structure comprises a third branch and a fourth branch, wherein a first end of the third branch is connected to the ground layer, a second end of the third branch extends along the first direction, a first end of the fourth branch is connected to the second end of the third branch, and a second end of the fourth branch extends away from the third branch along the second direction.

17. The electronic device according to claim 15, wherein the antenna layer comprises a radiation patch and a micro-strip feeder;
the radiation patch comprises a first radiation patch and a second radiation patch;
the micro-strip feeder comprises a first micro-strip feeder and a second micro-strip feeder; wherein the first micro-strip feeder is connected to the first radiation patch and configured to feed the first radiation patch, and the second micro-strip feeder is connected to the second radiation patch and configured to feed the second radiation patch;

the patch meander structure comprises at least one of a first radiation groove disposed on the first radiation patch and a second radiation groove disposed on the second radiation patch.

18. The electronic device according to claim 15, wherein the antenna layer comprises a radiation patch and a micro-strip feeder;
the radiation patch comprises a first radiation patch and a second radiation patch;
the micro-strip feeder comprises a first micro-strip feeder and a second micro-strip feeder; wherein the first micro-strip feeder is connected to the first radiation patch and configured to feed the first radiation patch, and the second micro-strip feeder is connected to the second radiation patch and configured to feed the second radiation patch;
the floor meander structure comprises at least one of a first floor groove corresponding to the first micro-strip feeder, a second floor groove disposed between the first micro-strip feeder and the second micro-strip feeder, and a third floor groove corresponding to the second micro-strip feeder.

19. A preparation method of an antenna unit, comprising:
forming a de-bonding layer on a glass substrate;
forming a ground layer, a floor meander structure, and a branch structure on a surface of the de-bonding layer away from the glass substrate;
forming a flexible dielectric substrate on a surface of the floor meander structure and the branch structure away from the glass substrate;
forming a radiation patch and a micro-strip feeder on a surface of the flexible dielectric substrate away from the glass substrate, wherein a patch meander structure is formed on the radiation patch; and
peeling off the de-bonding layer and the glass substrate.

* * * * *